United States Patent [19]
Boden et al.

[11] Patent Number: 5,930,512
[45] Date of Patent: Jul. 27, 1999

[54] METHOD AND APPARATUS FOR BUILDING AND RUNNING WORKFLOW PROCESS MODELS USING A HYPERTEXT MARKUP LANGUAGE

[75] Inventors: Edward Barnes Boden, Vestal; Robert Christian Hansen, Johnson City; Michael Anthony Leska, Endicott; Frank Vincent Paxhia, Binghamton; Scott Anthony Sylvester, Endicott, all of N.Y.

[73] Assignee: International Business Machines Corporation, Armonk, N.Y.

[21] Appl. No.: 08/731,392

[22] Filed: Oct. 18, 1996

[51] Int. Cl.⁶ .................................................. G06F 17/28
[52] U.S. Cl. .......................................................... 395/710
[58] Field of Search ............................... 705/7; 395/701, 395/710, 680; 707/4

[56] References Cited

U.S. PATENT DOCUMENTS

| | | | |
|---|---|---|---|
| 5,247,693 | 9/1993 | Bristol | 395/800 |
| 5,257,363 | 10/1993 | Shapiro et al. | 395/500 |
| 5,317,647 | 5/1994 | Pagallo | 382/14 |
| 5,325,533 | 6/1994 | McInerney et al. | 395/701 |
| 5,477,451 | 12/1995 | Brown et al. | 364/419.08 |
| 5,490,097 | 2/1996 | Swenson et al. | 364/578 |
| 5,490,266 | 2/1996 | Sturges | 395/500 |
| 5,519,866 | 5/1996 | Lawrence et al. | 395/710 |
| 5,586,314 | 12/1996 | Hill et al. | 707/4 |
| 5,734,837 | 3/1998 | Flores et al. | 705/7 |
| 5,754,857 | 5/1998 | Gadol | 395/680 |

FOREIGN PATENT DOCUMENTS

| | | | |
|---|---|---|---|
| 2075315 | 6/1993 | Canada | G06F 15/60 |
| 640941 | 3/1995 | European Pat. Off. | G06T 11/60 |
| 05108359 | 4/1993 | Japan . | |
| 2155218 | 9/1985 | United Kingdom . | |
| 8805190 | 7/1988 | WIPO . | |

OTHER PUBLICATIONS

Surichi Mohan, "Workflow Tools Head for Web," *Computer World*, Jan. 8, 1996.

Erica Schroeder, "Action hooks workflow into Internet," *PC Week*, Dec. 4, 1995.

IBM Corp., IBM FlowMark—Managing Your Workflow, Ver. 2.1, IBM Publication SH19–8243–00 (1995), pp. 3–10.

IBM Corp., FlowMark Banking Model, IBM Publication GH19–8217–02 (1994).

IBM Corp., FlowMark Insurance Model, IBM Publication GH19–8216–02 (1994).

Ledak, Model Management System, IBM Technical Disclosure Bulletin (TDB), vol. 27, No. 12, May 1985 pp. 7131–7133.

T.J. Bernhardt, et al, Computer System for the Animation of Process Models, IBM TDB vol. 38, No. 7 Jul. 1995 pp. 193–194, Abstract.

(List continued on next page.)

*Primary Examiner*—James P. Trammell
*Assistant Examiner*—Matthew Smithers
*Attorney, Agent, or Firm*—Shelley M Beckstrand

[57] ABSTRACT

Apparatus and computer implemented method for process modeling using both a web server and a workflow server in process definition. During buildtime, a process definition in the language of some workflow process modeler is fed to transform f(p), which provides a translate process definition into a hypertext markup language (HTML) representation of the workflow process. A user utilizing the facilities of an HTTP server may operate a web browser to request that HTTP server provide the HTML process definition to enable the user to create, or read and modify, the process definition as desired. The result is then fed through an inverse transform f'(p) to a workflow server in the language of that server, for invocation and execution during runtime of the programs defined during buildtime.

29 Claims, 19 Drawing Sheets

OTHER PUBLICATIONS

G. Froehlich, et al, "Providing Support for Process Model Enaction in the Metaview Meta system," Proceedings, Seventh Int'l Workshop on Computer–Aided Software Engineering, Toronto, CA, 10–14 Jul. 1995, IEEE Comput Soc Press. pp. 141–149, Abstract.

C. Bussler et al, "An Approach to Integrate Workflow Modeling and Organization Modeling in an Enterprize," Proceedings, Third Workshop on Enabling Technologies: Infrastructure for Collaborative Enterprises, IEEE Comput. Soc. Press, pp. 81–95 (1994), Abstract.

Warren, "CICS on the Internet", IBM TDB vol. 38, No. 12 Dec./ 1995, p. 549.

Rumbaugh et al, "Object–Oriented Modeling and Design", Prentice Hall, pp. 399–409,1991.

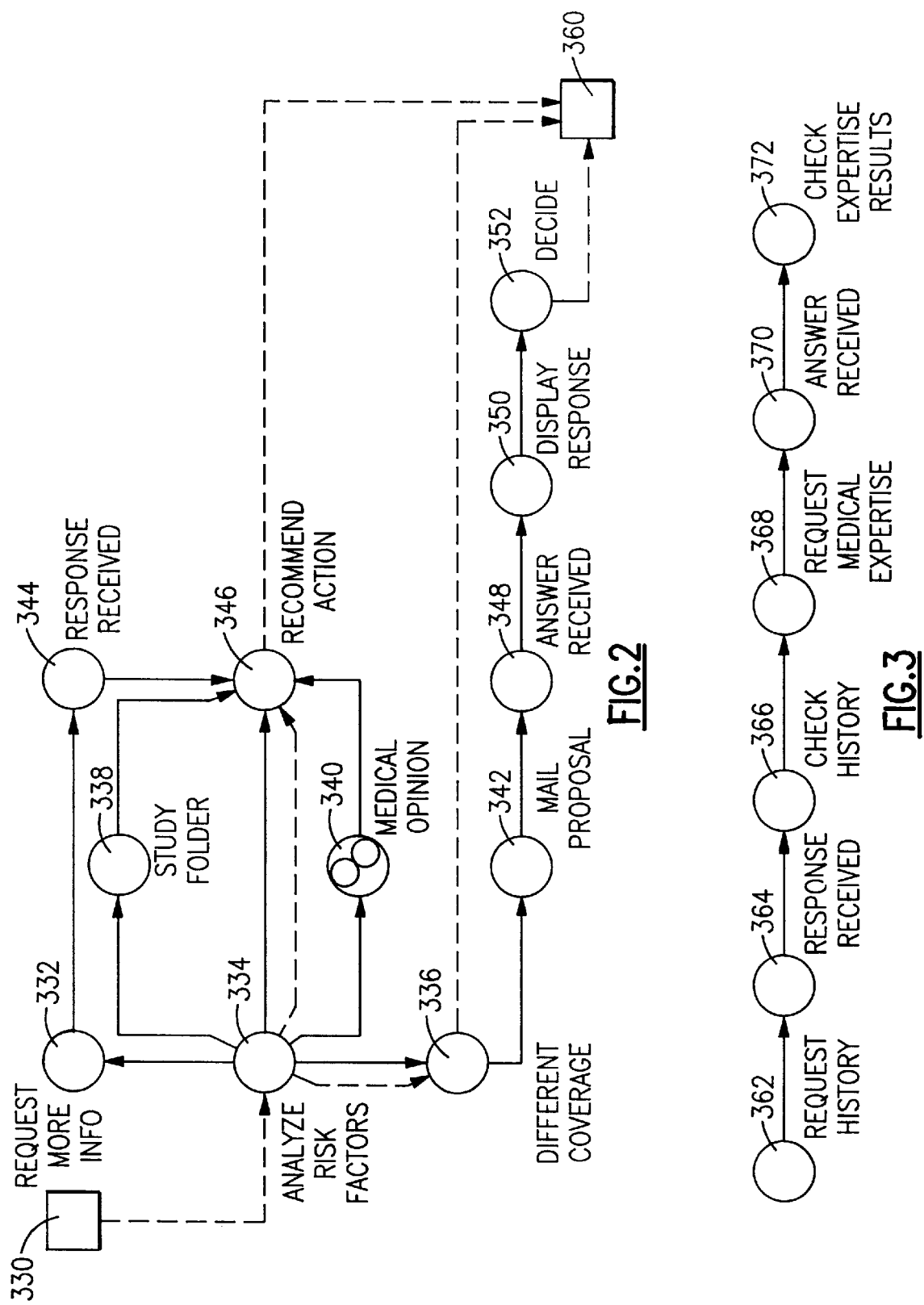

FIG.5

ENTER CLIENT INFORMATION

ENTER INFORMATION FOR PROPOSED INSURED:

NAME
FIRST: BROWN  MIDDLE: ARTHUR  LAST: ALBERT

DETAILS
⦿ MALE  ○ FEMALE  BIRTHDATE: 11/21/46
SS# 492-44-

WORK LIST (WATSON EXMDB) - DETAILS
WORK LIST  SELECTED  EDIT  VIEW  WINDOWS  HELP

| DESCRIPTION | STATUS | ACTIVITY TYPE | ACTIVITY NAME |
|---|---|---|---|
| DATA FOR NEW CLIENT | RUNNING | ACTIVITY | ENTER CLIENT INFORMATION |
| DATABASE SEARCH FOR CLIENT | READY | ACTIVITY | FIND CLIENT |
| FOLLOW-ON DECISIONS | SUSPENDED | ACTIVITY | ANALYZE RISK FACTORS |

OBJECTS:3  HIDDEN OBJECTS:0

| WORKFLOW PROCESS MODEL | | | | | | |
|---|---|---|---|---|---|---|
| ACTIVITY | STRUCTURE | ORGANIZATION | PEOPLE | PROGRAM | PROCESS | ROLE |

PROCESS DETAILS

'NEWEMPLOYEE'
  INPUT:    'NEWEMPDATA'
  OUTPUT:  'NEWEMPDATA'

STEPS OR ACTIVITIES

PROGRAM ACTIVITIES

'ADDEMPLOYEE'
        'ASSIGNEDUCATIONCLASSES'
        'ASSIGNOFFICE#ANDWSTYPE'
        'CHECKEMPLOYEESTATUS'

PROCESS ACTIVITIES

'REGISTEREMPLOYEE'
        'REQUESTFURNITURE'
        'REQUESTPHONE'
        'REQUESTWORKSTATION'

BLOCK ACTIVITIES

FIG.13

| WORKFLOW PROCESS MODEL | | | | | | |
|---|---|---|---|---|---|---|
| ACTIVITY | STRUCTURE | ORGANIZATION | PEOPLE | PROGRAM | PROCESS | ROLE |

PROCESS DETAILS

'NEWEMPLOYEE'

CONNECTORS

CONTROL CONNECTORS

'ADDEMPLOYEE' TO 'ASSIGNEDUCATIONCLASSES'
  'ADDEMPLOYEE' TO 'REGISTEREMPLOYEE'
  'ASSIGNOFFICE#ANDWSTYPE' TO 'REQUESTFURNITURE'
  'ASSIGNOFFICE#AND WSTYPE' TO 'REQUESTWORKSTATION'
  'ADDEMPLOYEE' TO 'ASSIGNOFFICE#ANDWSTYPE'
  'ASSIGNOFFICE#ANDWSTYPE' TO 'REQUESTPHONE'
  'REGISTEREMPLOYEE' TO 'CHECKEMPLOYEESTATUS'
  'REQUESTFURNITURE' TO 'CHECKEMPLOYEESTATUS'
  'REQUESTWORKSTATION' TO 'CHECKEMPLOYEESTATUS'
  'REQUESTPHONE' TO 'CHECKEMPLOYEESTATUS'

DATA CONNECTORS

'ADDEMPLOYEE' TO 'CHECKEMPLOYEESTATUS'
  'ADDEMPLOYEE' TO 'ASSIGNEDUCATIONCLASSES'
  'ADDEMPLOYEE' TO 'REGISTEREMPLOYEE'
  'ASSIGNOFFICE#AND WSTYPE' TO 'REQUESTFURNITURE'
  SOURCE TO 'ADDEMPLOYEE'
  'REGISTEREMPLOYEE' TO 'CHECKEMPLOYEESTATUS'
  'ADDEMPLOYEE' TO 'ASSIGNOFFICE#ANDWSTYPE'
  'ASSIGNOFFICE#ANDWSTYPE' TO 'REQUESTWORKSTATION'
  'ASSIGNOFFICE#ANDWSTYPE' TO 'REQUESTPHONE'

FIG.14

| WORKFLOW PROCESS MODEL | | | | | | |
|---|---|---|---|---|---|---|
| ACTIVITY | STRUCTURE | ORGANIZATION | PEOPLE | PROGRAM | PROCESS | ROLE |

PROCESS DETAILS

'NEWEMPLOYEE'

STRUCTURES

'COURSE'
    'DEFAULTDATASTRUCTURE'
    'FURNITURE'
    'MANUALACTIVITYDATASTRUCTURE'
    'NEWEMPDATA'
    'NEWEMPLOYEE'
    'OFFICE'
    'PERSON'
    'PHONE'
    'USERID'
    'WORKORDER'
    'WORKSTATION'

FIG.15

| WORKFLOW PROCESS MODEL — 468 |||||||
|---|---|---|---|---|---|---|
| ACTIVITY | STRUCTURE | ORGANIZATION | PEOPLE | PROGRAM | PROCESS | ROLE |

PROCESS DETAILS

'NEWEMPLOYEE'

PEOPLE

'ADMIN'
   'CEHAYS'
   'DCNAATZ'
   'FURN'
   'JCAMERON'
   'JOWALTS'
   'KIMMING'
   'KRJ'
   'LEAH'
   'MGARRY'
   'MORITZ'
   'MPGARRY'
   'PDYKES'
   'PHONY'
   'PMATTSON'
   'REGGIE'
   'TAWELLS'
   'TJR'
   'WORKSTAT'

FIG.16

| | | WORKFLOW PROCESS MODEL | | | | |  ⟵ 470
|---|---|---|---|---|---|---|
| ACTIVITY | STRUCTURE | ORGANIZATION | PEOPLE | PROGRAM | PROCESS | ROLE |

PROCESS DETAILS

'NEWEMPLOYEE'

ROLES

'COORDINATOR'
       'FURNITURE TECHNICIAN'
       'MANAGER'
       'PHONE TECHNICIAN'
       'REGISTRAR'
       'SYSTEM ADMINISTRATOR'
       'WORK STATION TECHNICIAN'

FIG.17

| | | WORKFLOW PROCESS MODEL | | | | |  ⟵ 472
|---|---|---|---|---|---|---|
| ACTIVITY | STRUCTURE | ORGANIZATION | PEOPLE | PROGRAM | PROCESS | ROLE |

PROCESS DETAILS

'NEWEMPLOYEE'

ORGANIZATIONS

'FACILITIES DEPT'
       'FURNITURE DEPT'
       'HELP DESK DEPT'
       'INFORMATION SYSTEMS DEPT'
       'PHONE DEPT'
       'SYSTEM REGISTRATION DEPT'
       'THE ORGANIZATION'
       'WORK STATION DEPT'

FIG.18

| WORKFLOW PROCESS MODEL | | | | | | |
|---|---|---|---|---|---|---|
| ACTIVITY | STRUCTURE | ORGANIZATION | PEOPLE | PROGRAM | PROCESS | ROLE |

PROCESS DETAILS

'NEWEMPLOYEE'

PROGRAMS

'ACCESSSYSTEMPROFILESC++'
    'ACCESSSYSTEMPROFILESIPMD'
    'ADDANDAUTTHUSERC++'
    'ADDEMPLOYEEC++'
    'ADDEMPLOYEEC++IPMD'
    'ADDEMPLOYEEIPMD'
    'ASSIGNEDUCATIONC++'
    'ASSIGNEDUCATION++IPMD'
    'ASSIGNOFFICEANDWSTYPEC++'
    'ASSIGNOFFICEANDWSTYPEC++IPMD'
    'CHECKEMPLOYEESTATUSC++'
    'CHECKEMPLOYEESTATUSIPMD'
    'CKFURNINVENTORYC++'
    'CKFURNINVENTORYIPMD'
    'CKWSINVENTORYC++'
    'CKWSINVENTORYIPMD'
    'DETERMINEFURNTPC++'
    'DISPATCHFURNWOC++'
    'DISPATCHPHONEWOC++'
    'DISPATCHWSWOC++'
    'EXMCHECKLIST'
    'FINDAVAILPHONEC++'
    'FINDAVAILPHONEIPMD'
    'UPDATESYSDIRECTORYC++'
    'OS2TREE'
    'OS2PSTAT'

FIG.19

| WORKFLOW PROCESS MODEL | | | | | | |
|---|---|---|---|---|---|---|
| ACTIVITY | STRUCTURE | ORGANIZATION | PEOPLE | PROGRAM | PROCESS | ROLE |

PROCESS DETAILS

'NEWEMPLOYEE'

ACTIVITIES

'ADDEMPLOYEE'
    'ASSIGNEDUCATIONCLASSES'
    'ASSIGNOFFICE#ANDWSTYPE'
    'CHECKEMPLOYEESTATUS'
    'REGISTEREMPLOYEE'
    'REQUESTFURNITURE'
    'REQUESTPHONE'
    'REQUESTWORKSTATION'
    'ACCESSSYSTEMPROFILES'
    'ADDANDAUTHORIZEUSER'
    'CHECKFURNITUREINVENTORY'
    'DETERMINEFURNITURETYPE'
    'DISPATCHFURNWORKORDER'
    'DISPATCHPHONEWORKORDER'
    'FINDAVAILABLEPHONE#'
    'UPDATESYSTEMDIRECTORY'
    'CHECKWORKSTATIONINVENTORY'
    'DISPATCHWSWORKORDER'
    'OS2 TREE'
    'OS2 PSTAT'

FIG.20

METHOD AND APPARATUS FOR BUILDING AND RUNNING WORKFLOW PROCESS MODELS USING A HYPERTEXT MARKUP LANGUAGE

BACKGROUND OF THE INVENTION

1. Technical Field of the Invention

This invention relates to an apparatus and computer implemented method for process modeling. More particularly, it relates to an apparatus and method for using both a web server and a workflow server in process definition.

2. Background Art

As business processes become more and more complex, planning and managing all the activities and resources involved in getting a job done become more challenging. Tracking the flow of work through an enterprise requires time and diverse skills and knowledge.

These challenges can be reduced by using a well-documented workflow model to automate business processes Automating such processes can save an organization time and money by presenting the right activity to the right person at the right time, supported by the information and the programs to perform the activity Such a workflow model may contain business regulations which need to be enforced.

The IBM FlowMark (TM) workflow manager is an example of a workflow server that provides for automation of business processes. It integrates the tasks performed by computer applications with the everyday tasks of staff members.

The FlowMark manager includes a buildtime module and a runtime module.

The buildtime module provides for defining, graphically depicting, and documenting models of the processes; assigning staff members to the activities in the processes; associating OS/2, AIX, and Windows programs with particular activities; and animating workflow models to test them.

The runtime module provides for starting processes that have been translated from buildtime; managing processes that are already started; starting activities that running processes make ready; transferring activities from one user's work list to that of another; and tracking processes and the status of activities assigned to staff members.

FlowMark provides as many separate FlowMark databases as are needed. Upon logging on to the FlowMark workflow manager, the user specifies which databases are to be accessed. An advantage of multiple databases is that one database may be used for developing and testing workflow models, and another one used for executing tested models and operational processes.

The FlowMark workflow manager normally runs as a distributed application on local area networks that consist of several workstations, in a client-server configuration One or more workstations act as FlowMark servers, and the FlowMark clients run on other workstations. It is possible, however, to have a FlowMark server and clients on one (stand-alone) workstation.

The IBM FlowMark product is one example of a workflow product. It uses the FlowMark definition language (.fdl) to define processes. Other workflow products represent processes in different process definition languages. For example, the Action Technologies (AT) workflow product represents processes in .ama files. Yet other workflow servers include the IBM AS/400 Workflow Automation Facility (WAF), and FileNet. A problem with such workflow servers is that processes defined for one workflow server product cannot be run on a different workflow server. Further, none of these process definition languages are directly compatible with internet access and world wide web browsers; that is, they have no hypertext markup language tags.

The internet is the worlds largest computer network. Such a network is a network of interconnected computer networks. The World Wide Web is a system for accessing text, programs, pictures, sounds, movies and so forth over the internet via a simple graphical interface. Two key protocols supporting the World Wide Web (WWW) are the HyperText Transfer Protocol (HTTP) and the HyperText Markup Language (HTML). The Hypertext Markup Language (HTML) is a word and data processing and presentation format by which words, references to files, and references to internet resources are presented to a user. HTML is the protocol by which information is exchanged between an HTTP server and a web browser. Hypertext is a document that contains uniform resource locators (URLs), or hypertext markup language (HTML) tags, which are hot links to other documents, data, and programs that can be accessed using a web browser.

A typical usage scenario would have a user activating his or her web browser and pointing it (that is, giving it an address) to a source of information, such as a document The HTTP server accesses this information and returns the document to the browser. The browser then correctly displays the information to the user. That information may include URLs (typically, highlighted text) which the user may activate (click on with, for example, a cursor controlled by a mouse) to access yet further information at the same or yet another source.

There is a need in the art for connecting internet (specifically, the world wide web) web servers and workflow servers.

It is, therefore, an object of this invention to provide a workflow server which utilizes the resources of the internet, including hypertext tags.

It is a further object of this invention to provide a workflow process model translator whereby web flow servers and workflow servers both participate in process definition.

Yet further, it is an object of this invention to provide a method and apparatus whereby processes described by one workflow server in accordance with a first process definition language may be modelled and executed in a second, different process definition language.

SUMMARY OF THE INVENTION

This invention provides a computer implemented method and system for implementing a workflow process server. A collection of processes defining a business workflow is generated, and transformed to a set of HTML pages representing the processes. A web browser is operated to access the HTML pages via an HTTP server selectively to edit or execute the processes.

In accordance with a further embodiment of the invention, executing the processes is accomplished by (1) inverse transforming the related HTML page (also known as a HTML process definition) to the language of a workflow server (such as FDL), and (2) invoking the process on the workflow server. Hot links may be provided within the HTML syntax for providing an anchor tag to related processes.

Other features and advantages of this invention will become apparent from the following detailed description of the presently preferred embodiment of the invention, taken in conjunction with the accompanying drawings.

BRIEF DESCRIPTION OF THE DRAWINGS

FIG. 2 is a process diagram for the evaluation block of FIG. 1.

FIG. 3 is a process diagram for the medical opinion subprocess of FIG. 2.

FIG. 5 is a FlowMark representation of activities on a worklist.

FIG. 13 is a representation of a workflow process model display of activities.

FIG. 14 is a representation of a workflow process model display of connectors.

FIG. 15 is a representation of a workflow process model display of structures.

FIG. 16 is a representation of a workflow process model display of people.

FIG. 17 is a representation of a workflow process model display of roles.

FIG. 18 is a representation of a workflow process model display of organizations.

FIG. 19 is a representation of a workflow process model display of programs.

FIG. 20 is a representation of a workflow process model display of activities.

BEST MODE FOR CARRYING OUT THE INVENTION

Outline

Figure 1:
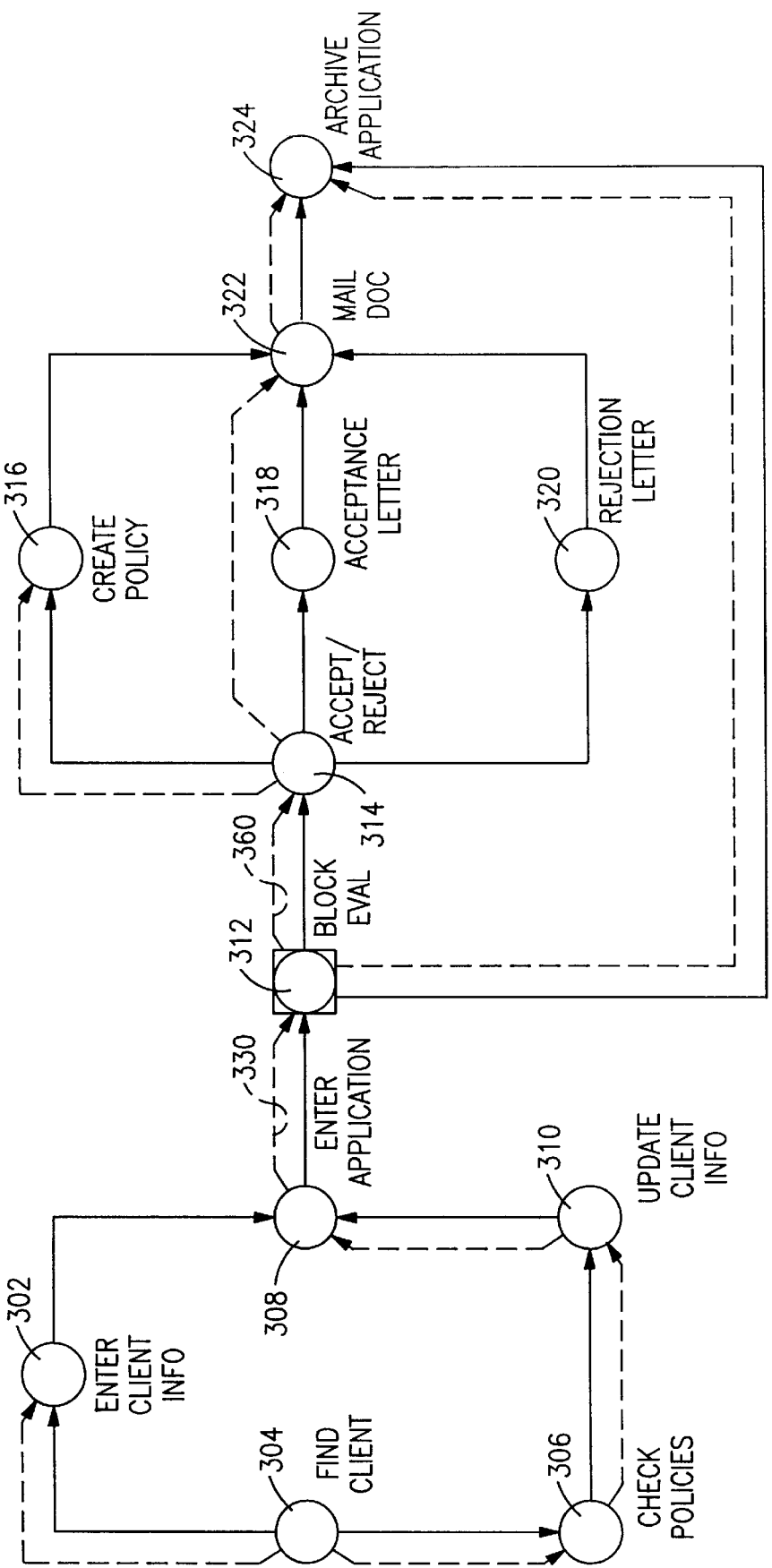
FIG. 1 is a process diagram for a life insurance workflow model.

1. Workflow Modeling
   1.1 Concepts and Definitions
   1.2 Insurance Example
2. Workflow Modeling on the Internet
   2.1 Process 110
   2.2 Workflow Server 120
   2.3 Web Browser 130
   2.4 HTML Process Definition 150
   2.5 Web Server (HTTP Server) 160
   2.6 f(p) Transform 142
   2.6.1 Scan and Parse (Front End) 144
   2.6.2 Internal Representation 149
   2.6.3 HTML Process Representation (Back End) 148
   2.6.4 fI(p) Inverse Transform 170
3. Method of Operation: Viewing, Editing and Executing Workflow Processes

1. Workflow Modeling

Referring to FIGS. 1 through 5, before describing the specifics of the invention with respect to workflow modeling on the internet, a description and example will given of workflow modeling concepts in general.

1.1 Concepts and Definitions

Components of a FlowMark Workflow Model

A workflow model is a complete representation of a process, comprising a process diagram and the settings that define the logic behind the components of the diagram.

Using the settings, notebooks and other dialogues provided by, for example, the IBM FlowMark Buildtime module, the user creates workflow models and then converts them into process templates for use in the FlowMark Runtime module.

Process Diagram

Whereas a process document uses words to describe the sequence of working procedures, a process diagram uses symbols to represent the activities that make up the process. The possible ways that work and data can flow through a model are represented graphically by arrows called connectors.

A workflow model consists of several elements:

Process
Activity
Block
Connector
Datastructure
Condition
Program
Person

Other workflow model elements may include:

Node setting
Description
Attribute
Organization
Role
Level
Subentity

Process

A process is a sequence of activities that must be completed to accomplish a task. The process is the top-level element of a FlowMark workflow model. In a FlowMark process, the following are defined: how work is to progress from one activity to the next; which persons are to perform activities and what programs they are to use; and whether any other processes are nested in the process. Multiple instances of a FlowMark process can run in parallel.

Process Category

To restrict the number of people authorized to start and control a process, the process is assigned to a process category Grouping related processes into a category also enables authorization of a person for several processes at once.

Activity

An activity is a step within a process. It represents a piece of work that the assigned person can complete by starting a program or another process. In a workflow model, the following information is associated with each activity: the conditions that must be met before the activity can start; whether the activity must be started manually by a user or can start automatically; what condition indicates that the activity is complete; whether control can exit from the activity automatically or the activity must first be confirmed as complete by a user; how much time is allowed for completion of the activity; who is responsible for completing the activity; and what data is required as input to the activity and as output from it.

A FlowMark workflow model consists of the following types of program activities and process activities.

A program activity has a program assigned to perform it. The program is invoked when the activity is started In a fully automated workflow, the program performs the activity without human intervention. Otherwise, the user must start the activity by selecting it from a Runtime work list. Output from the program can be used in the exit condition for the program activity and for the transition conditions to other activities.

A process activity has a process assigned to perform it. The process is invoked when the activity is started. A process activity represents a way to reuse a set of activities that are common to different processes. Output from the process can be used in the exit condition for the process activity and for the transition conditions to other activities.

Block

A block is a modeling construct used in a process diagram for one or more of the following purposes: reducing the complexity of a process diagram whereby several activities are grouped and blocks nested together under one block symbol to keep the process diagram uncluttered; looping through a series of activities, whereby an exit condition is specified for the block, the activities in the block are executed repeatedly until the exit condition evaluates to true; implementing bundles by following the restrictions for bundles to replicate a single activity as many times as are necessary to process data input to the block at run time.

Bundle

A bundle is a special kind of block that supports multiple instantiations of a single program or process activity at run time. Use of this modeling construct enables the workflow model to cope with situations where an indeterminate number of activities are required at run time.

The activity that is replicated is called the pattern activity, and each instance of it is called a bundle activity The number of bundle activities created at runtime is determined by a special program activity called the planning activity.

Control Flow

The flow of control through a running process determines the sequence in which activities are executed. The Flow-Mark workflow manager navigates a path through the process that is determined by the evaluation to true of start conditions, exit conditions, and transition conditions.

Connector

Connectors link activities in a workflow model. Connectors define the sequence of activities and the transmission of data between activities. The activity from which a connector originates is called the origin activity. The activity to which the connector points is called the target activity. Connectors are not required in a workflow model in which all activities should become ready to start when the process is started and no data is passed between activities.

In FlowMark process diagrams, there are the control connectors, default connectors, and data connectors.

A control connector specifies the sequence of activities in a workflow model. Several control connectors can be associated with an activity. A control connector has a condition associated with it that directs the flow. This is called a transition condition.

A default connector specifies where control should flow when the transition condition of no other control connector leaving an activity evaluates to true. Default connectors enable a workflow model to cope with exceptional events.

A data connector specifies the flow of data in a workflow model. A data connector originates from an activity or a block and has an activity or a block as its target. It may specify that output data is to go to one target or to multiple targets. A target can have more than one incoming data connector.

Data Container (Data Structures)

In a FlowMark workflow model, storage is allocated for the input and output data of the process and of the activities and blocks within it.

Each activity has a data container for input and a data container for output. To transfer data to and from blocks or processes, the model uses the source and sink data containers. Source represents the input container for a process or block, and sink represents the output container.

Each data container is defined by a data structure. Data connectors represent the transfer of data from output containers to input containers. When a data connector joins an output container with an input container, and the data structures of the two containers match exactly, the FlowMark workflow manager maps the data automatically. Otherwise, individual members of the output data structure must be mapped onto members of the input data structure.

A data structure is an ordered list of variables, called members, that have a name and a data type. Data types are string, long, floating point, and structure. The FlowMark workflow manager supports one-dimensional arrays of any of these data types.

The FlowMark workflow manager provides an "empty" default data structure that is assigned as input and output for every process, activity, and block. This assignment can be replace with a user-defined data structure.

Predefined Data Structure Member

The FlowMark workflow manager also provides several predefined data structure members that describe variables for use in defining exit and transition conditions, for defining process and activity settings with the FlowMark application program interface (API), and as input to the command-line interface of programs.

Storage is automatically allocated for data structures in the input and output data containers of processes, activities, and blocks. Every data container contains the appropriate predefined data structure members and optionally the members of a user-defined data structure that is assigned by the user to the process, activity, or block.

Condition

Conditions are the means by which the flow of control is specified in a process. In FlowMark workflow models, logical expressions are defined by the user that are evaluated by FlowMark Runtime to determine when an activity may start, end, and pass control to the next activity.

There are start, exit, and transition conditions.

A start condition determines when an activity with incoming control connectors can start. The start condition may specify that all incoming control connectors must evaluate to, true, or it may specify that at least one of them must evaluate to true. Whatever the start condition, all incoming connectors must be evaluated before the activity can start. If an activity has no incoming control connectors, it becomes ready when the process or block containing it starts.

An exit condition is a, logical expression that, if specified, must evaluate to true for control to pass from an activity or block.

A transition condition is a logical expression associated with a control connector. If specified, it must evaluate to true for control to flow along the connector.

Program

In the FlowMark workflow manager, program means a computer-based application program that supports the work to be done in an activity Program activities reference executable programs using the logical names associated with the programs in FlowMark programs registrations. The program registration can contain run-time parameters for the executable program.

Person (Staff)

Each activity in a process is assigned to one or more staff members defined in the FlowMark database. Whether an activity is started manually by the user or automatically by the FlowMark workflow manager, and whether it requires user interaction to complete or completes automatically, a staff member must be assigned to it.

FlowMark staff (person) definition entails identifying people at the enterprise to the FlowMark database and, for each person defined, specifying a level, an organization, and multiple roles. These attributes can be used at run time to dynamically assign activities to people with suitable attributes.

Node setting

A process is represented by a directed graph. A node represents various things within that graph: typically, a process step. The arrows represent data or control flow into that process step. A node setting is a collection of attributes about the physical characteristics of the node as represented on the screen, including location, color, icon. This is used to preserve graphical information that has no workflow meaning across the translation processes.

Description

A description is text describing the various other workflow elements.

Attribute

An attribute is associated with other workflow elements and provides characteristics that are important during workflow processing. Example: a process definition attribute is an authorization role (which roles are allowed to define or execute this process.)

Organization

An organization is the structure of human reporting relationships or hierarchy and describes the organization in which the business processes are defined or execute.

Role

A role is a label that groups people based upon the type of business activity they typically perform; e.g., accountants, mechanical engineers, actuaries, safety response persons.

Level

A level is an arbitrary sequencing of a process authority. A level can be associated with each individual, role or organization and used to authorize the definition and execution of processes. One level may be authorized to define, and only lower levels authorized to execute.

Subentity

A subentity represents a workflow element decomposition—any workflow element may be decomposed into subentities which preserves their original identity as an entity.

How These Pieces Fit Together

In a workflow model, the user draws a diagram of the process using the symbols for activities and blocks. The process can consist of just one activity or of many activities and blocks.

All the activities in the process may be left detached from each other, in which case they all become ready to start simultaneously If the order in which activities start is important in the process, the user can control this by linking them with control connectors. When the process is running, the conditions defined by the user on these connectors are used to determine which activities are started and which are not.

Activities and blocks may be linked with data connectors if the data used by or resulting from one activity is required by a subsequent one.

People and programs are assigned by the user to the activities. An activity may be assigned to a specific person or to a group of people who meet specific criteria at run time. Any one of them can start the activity.

The program registrations that are assigned to activities and any input and output data structure definitions that the activities require must be known to the FlowMark database before the user creates his model.

Changes can be made to the workflow model, or it may even be erased after it has been translated, and the template and instances of it used in Runtime are not affected. (The concept of template and instance will be described hereafter.) If a changed version of the model is to be used in Runtime, the changed version must be translated.

Having described a workflow process model in general, an exemplary instance of such will next be described.

1.2 Insurance Example

Referring to FIGS. 1–5, a workflow insurance process model is described. This is a small workflow for processing an application for life insurance through the sales and underwriting departments of an insurance company. In this example, a distributed OS/2 application operates on a local area network. The server coordinates clients and the database. The buildtime client supports the modeling of workflows and system administration. The runtime client supports staff members who start processes and use work lists.

In this example, sales assistants find whether the applicant is a new client or already has other policies with the company, and enter data from the application into the company database. Underwriters evaluate the application data for risk factors. They can decide on the spot about the application, can send it for further analysis or a medical opinion, or can propose different coverage before deciding. Correspondence gets sent, responses get reviewed, a policy is prepared if the decision is to accept, and the application is archived.

During buildtime, during which a model is created, the process is drawn as a graph, as illustrated in FIGS. 1 through 3, using, in this example, the FlowMark modeling component. The activities of the process are laid out and connected in sequence. Defined for each activity are who is to do it, what conditions must be met for it to start, and what conditions determine when it is finished. The persons eligible to start the process are defined.

The insurance model of this example includes these modeling constructs: program activities, control and data connectors, blocks, and process activities.

The program activities include find client 304, check policies 306, update client information 310, enter client information 302, enter application 308, accept/reject 314, create policy 316, acceptance letter 318, rejection letter 320, mail documents 322, archive application 324, analyze risk factors 334, request more information 332, study folder 338, response received 344, recommend action 346, different coverage 336, mail proposal 342, answer received 348, display response 350, decide 352, request history 362, response received 364, check history 366, request medical expertise 368, answer received 370, check expertise results 372.

Control connectors (solid connecting lines) model the sequence of program activities and the logic for moving from one activity to the next. Data connectors (dashed connecting lines) model how data is passed from one activity to another.

Blocks group a set of many activities, or a process which is complex in some other way. In this example, block evaluation 312 includes the activities in FIG. 2 for assessing risk factors and proposing alternative coverage. Source block 330 and sink block 360 represent the input and output data containers of block evaluation 312, and show the flow of data into and out of the block.

A process activity is created to call another process. In this model, process medical opinion 340 is called to prompt an underwriter to get advice about an application from a medical specialist, as is shown in FIG. 3.

Figure 4:
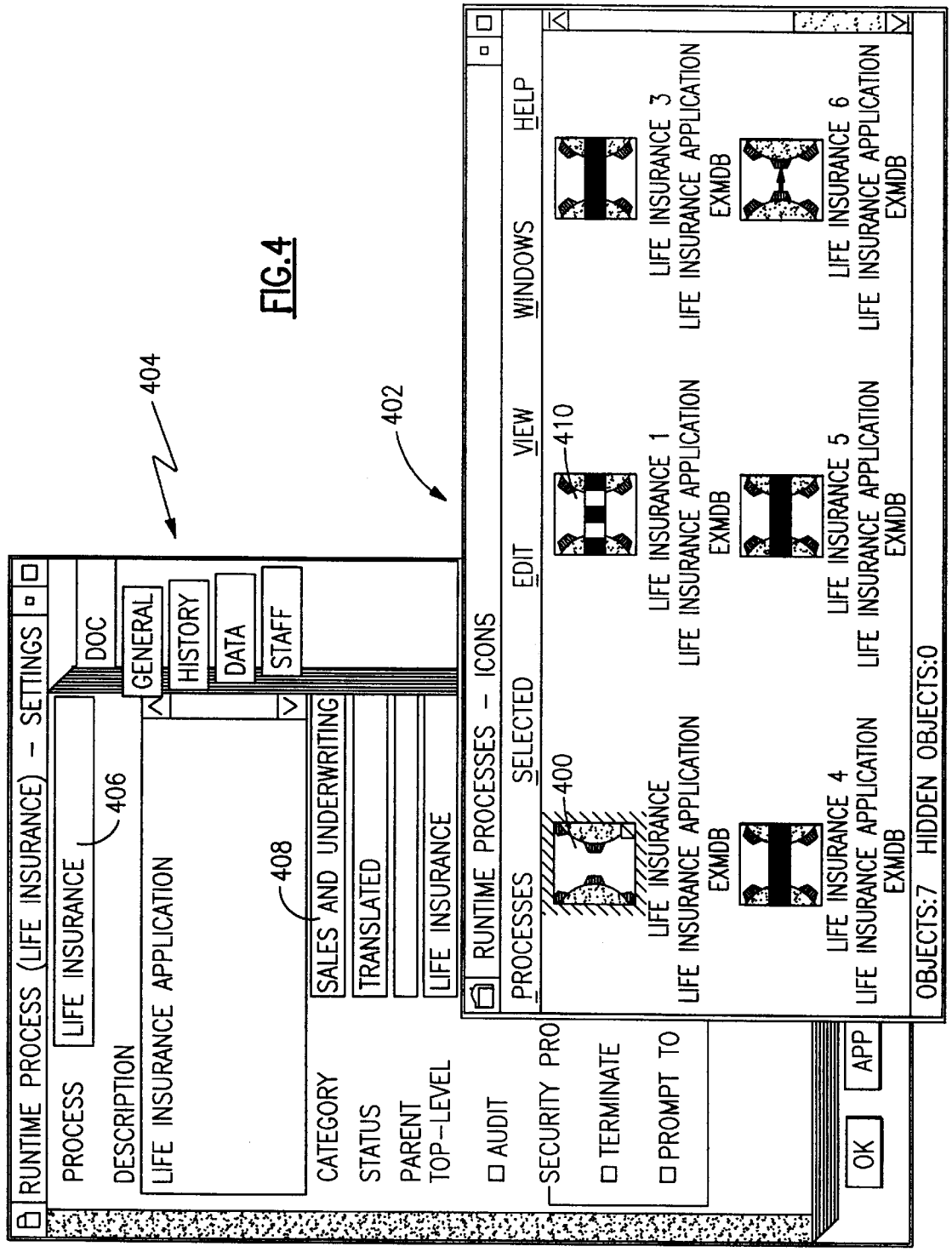
FIG. 4 is a FlowMark life insurance model translated into its runtime process template, with several instances of the process in various stages of completion.

Referring to FIGS. 4–5, once the model has been built, as illustrated above in connection with buildtime, it is next translated into a template of the process, which appears in the runtime component. Life insurance template appears as icon 400 in runtime processes window 402, shown in FIG. 4 along with its settings notebook 404. Settings notebook 404 describes process characteristics, there being a settings notebook for each process instance, with information for the person who starts the process, in this case, life insurance process 406.

The insurance model of this example authorizes staff members belonging to the category sales and underwriting 408 to start instances of life insurance 406. Process instances are created by pointing to its template 400 with the mouse pointer and double-clicking the mouse button. In response, an icon 410 for the new instance appears in runtime processes window 402. Double-clicking on instance icon 410 starts the process, and the first activity, enter client information 302, appears on work list 412, ready to be started.

If the life insurance model of this example needs to be changed, modelers make the changes to the model in buildtime, and replace the life insurance template with a new template 400 in runtime processes 402.

When an instance of the life insurance process is started by an authorized staff member, its first activity 302 appears on the work list of the person (or group of people) assigned to perform it. In worklist 412, program activities 414 for several instances 410, etc., of insurance process 400, 406 appear. Enter client information program 302 prompts Watson to enter data for a new client into the company's database. When Watson finishes with program 302, control is passed to the next activity for this instance 410 of insurance process 400, 406, enter application 308, with the client data available to it. Enter application 308 appears on the work lists (not shown) of sales assistants assigned to that activity. Watson can attend to the next item on the Watson work list 414, that is, find client 304 followed by analyze risk factors 334.

Programs developed for workflow can be modular and reusable in several different processes.

A process model can be animated from the beginning or from any point in the process, including tracing what happens, checking status of control and data flow, checking contents of work lists, entering trial data for activities and setting return codes for programs.

2. Workflow Modeling on the Internet

Having described workflow process models in general, and a specific example, the apparatus and method of the invention for translating and executing such models using the facilities of the internet will next be described. This will be described in the context, first, of internet access for the IBM FlowMark process modeler. However, the invention is not limited to just the IBM FlowMark modeler, and may be extended to other workflow process models by providing the correct transforms from such other workflow process to an internet language such as HTML, fdl, or the like, and back again.

It is an advantage of the internet today that HTML is supported by almost all web browsers. Consequently, this preferred embodiment of the invention will be described as the conversion of a FlowMark workflow process model to HTML and back to a process language that FlowMark can use, the Flowmark Data Language (.fdl). Similar transformations can be provided for any workflow process server. Understanding this, a set of processes may be provided on the internet (world wide web), and users of the internet given the option to inspect, browse, and execute one or more of them on a workflow server selected by the user.

While one user (such as an individual, company, or enterprise) could have a set of workflow processes based on FlowMark, because of the translations or conversions provided by this invention to a standard intermediate representation, that user could run its workflow processes on a workflow server other than FlowMark. A workflow process may be modeled using one modeler at buildtime, and that process be executed using a different modeler at runtime.

Figure 6:
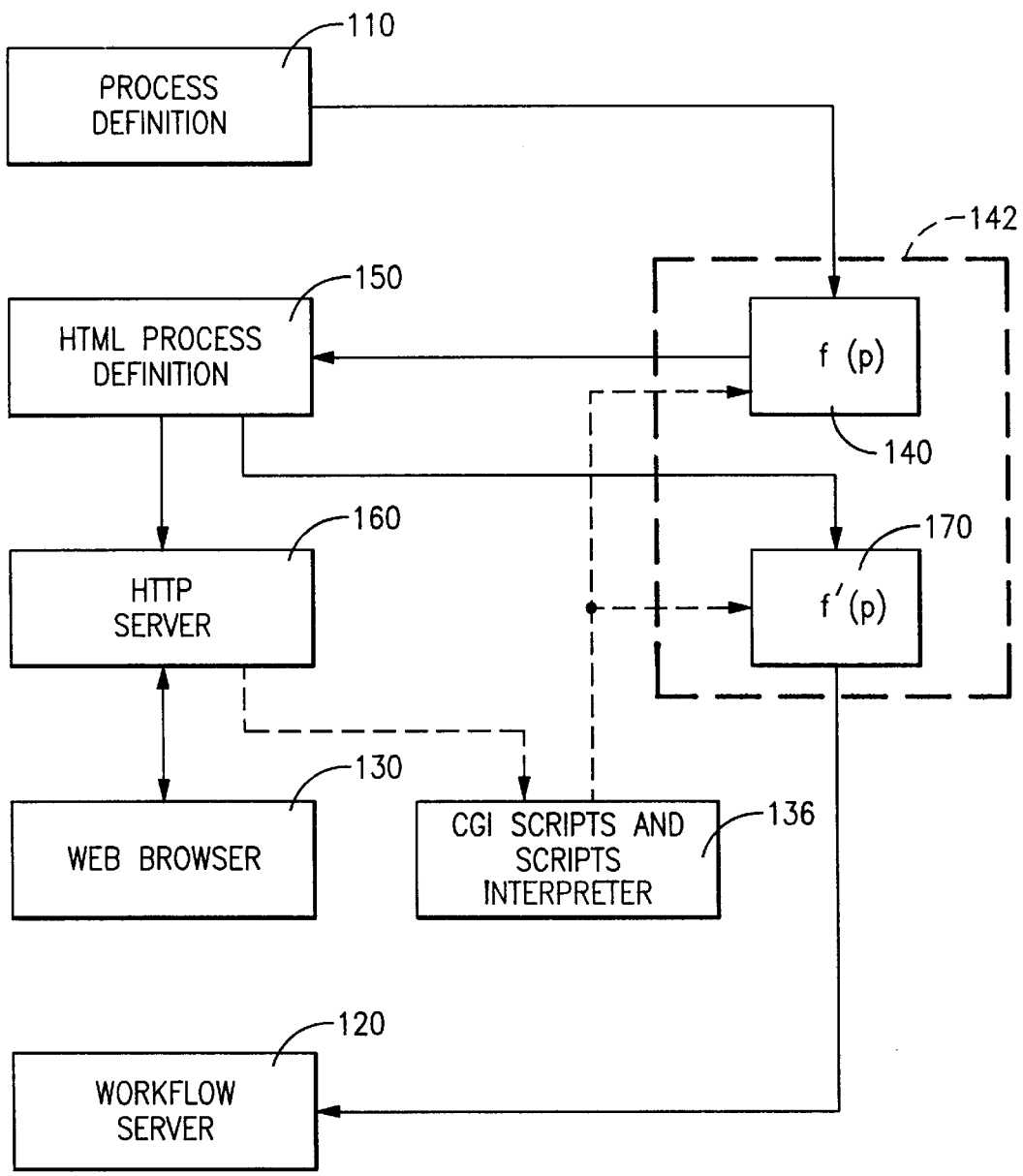
FIG. 6 is a block diagram representation of the program structure of the invention.

Referring to FIG. 6, a diagrammatic illustration of the structure of the invention is given. In FIG. 6, solid lines indicate data flow, and the dotted lines control flow. This structure illustrates the relationships between process 110, workflow server 120, web browser 130, transformation block 142, including f(p) transformation 140 and f'(p) inverse transformation 170, HTML process definition 150, HTTP server 160, and CGI scripts and scripts interpretter 136.

As will be more fully described hereafter, a process definition 110 is fed to f(p) transformation 140 which, in this specific embodiment generates HTML process definition 150. HTML process definition 150 is fed to HTTP server 160 and f'(p) inverse transformation 170. HTTP server 160 is responsive also to a user at web browser 130, and provides CGI scripts and scripts interpretter 136, the output of which is fed to f(p) transformation 140 and to f'(p) inverse transformation 170, the output of which is fed to workflow server 120.

Figure 7:
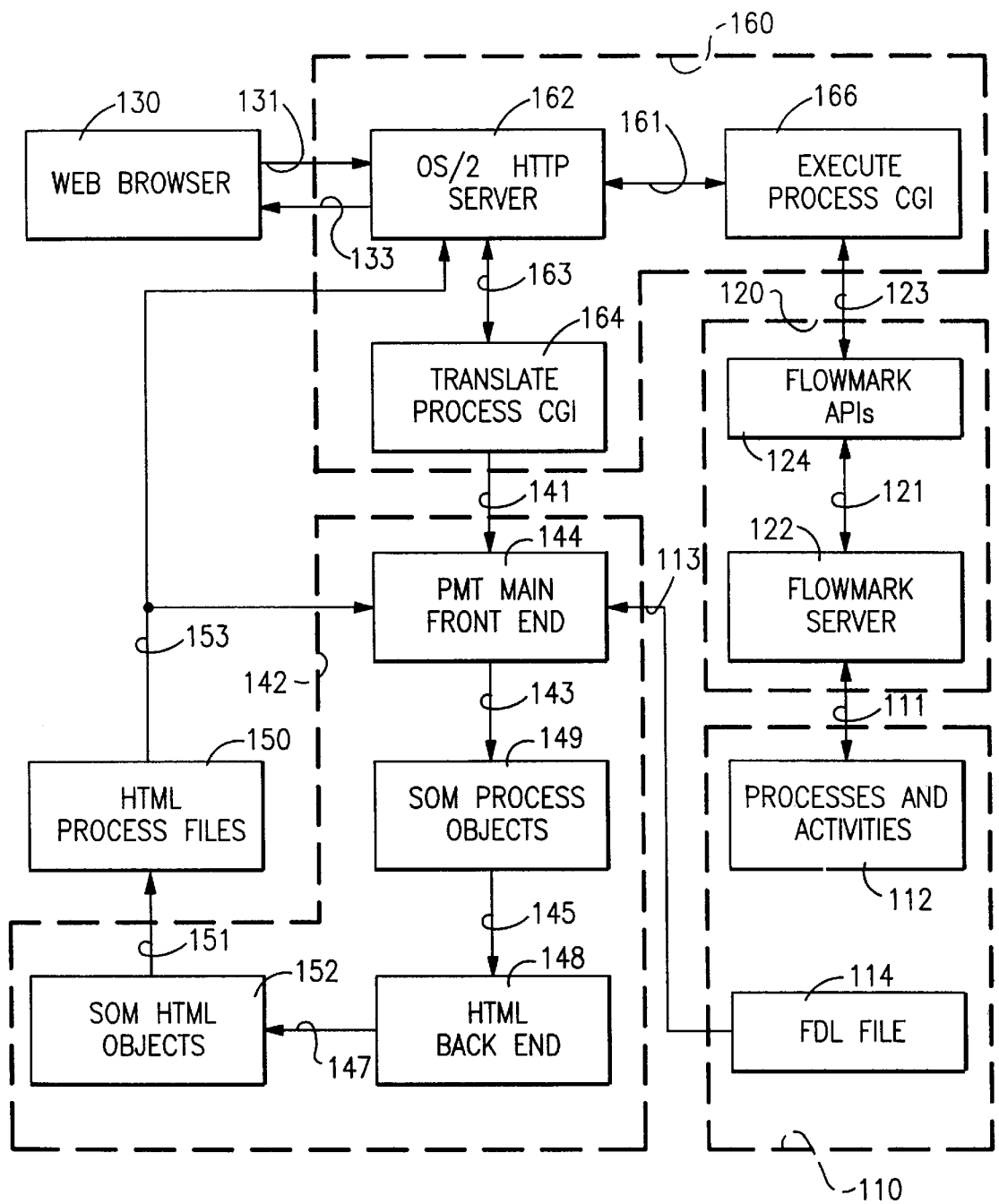
FIG. 7 is a more detailed block diagram representation of the program structure of the invention.

Referring to FIG. 7, a more detailed description with a slightly different view of the invention is provided, which allows, in this instance, for a description of both buildtime and runtime execution of a workflow process modeler using the facilities of the internet. In this more specific embodiment, process definition 110 includes processes and activities module 112 and FDL file 114; workflow server 120 includes FlowMark server 122 and FlowMark application program interface (api) 124; transform 142 includes process model translator (PMT) front end 144, system object mode (SOM) process objects 149, hypertext markup language (HTML) back end 148, and SOM HTML objects 152, and HTTP server 160 includes OS/2 HTTP server 162, translate process common gateway interface (CGI) 164, and execute process CGI 166. Transform 142, together with HTML process files 150, will be described hereafter more fully in connection with FIG. 8.

Referring further to FIG. 7, web browser 130 interfaces with OS/2 HTTP server 162 as is represented by lines 131 and 133; HTTP server 162 interfaces with execute process CGI 166 and translate process CGI, as is represented by lines 161 and 163, respectively; execute process CGI 166 also interfaces with FlowMark API 124 (line 123); translate process CGI 164 also interfaces with process model translator (PMT) main front end 144 (line 141) and OS/2 HTTP server 162 (line 163). FlowMark API 124 also interfaces with FlowMark server 122 (line 121), which also interfaces with processes and activities 112 (line 111). PMT main front end 144 also interfaces with SOM process objects 146 (line 143), which also interfaces with HTML back-end 148 (line 145), which also interfaces with SOM HTML objects 152 (line 147), which also interfaces with HTML process files 150 (line 151). HTML process files 150 interfaces with PMT main front end 144 and OS/2 HTTP server 162, as is represented by line 153. FDL file 114 interfaces with PMT main front end 144 (line 113.)

In accordance with the invention, internet access is provided for workflow via any client world-wide. Common gateway interfaces (CGI) are provided for translating workflow processes over the internet, for executing workflow processes over the internet, and for navigating workflow processes via HTML from any client world-wide Object technology SOM/DSOM classes for workflow process model translation is provided, as is SOM/DSOM tag classes for document creation, including SOM/DSOM HTML factory for HTML document creation. Integration technology provided includes an FDL parser, an HTML parser, an FDL document processor, and an HTML document processor.

Referring again to FIG. 6, by way of overview of the operation of the invention during buildtime, a process definition 110 in the language of some workflow process modeler is fed to transform f(p) 140, which translates the input from process definition 110 into hypertext markup language (HTML) representation 150 of the workflow process Alternatively and in addition to generating HTML process definition by way of transformation 140 on process definition 110, a user utilizing the facilities of HTTP server 160, may operate web browser 130 to request that HTTP server 160 provide the HTML process definition 150 to enable the user to create, or read and modify, process definition 150 as desired. The result may then be fed through inverse transform f'(p) 170 to workflow server 120 in the language of that server, for invocation and execution during runtime of the programs defined during buildtime.

2.1 Process 110

Referring now to FIGS. 6 and 7, process 110, including processes and activities 112 and FDL file 114, represents a sequence of activities that must be completed to accomplish a task. Such a process is the top-level element of a workflow model. In, for example, an IBM FlowMark process 110, the following are defined: how work is to progress from one activity to the next; which persons are to perform activities and what programs they are to use; and whether any other processes are nested in the process. Examples of such processes include the insurance process previously described, and the add employee process described hereafter. An FDL file is a text file that defines a process. Processes and activities 112 describes the run-time representation of processes, activities and status as the server executes the process.

2.2 Workflow Server 1.20

Workflow server 120, including in this embodiment APIs 124 and server 122, provides for automation of business processes. An example is the IBM FlowMark workflow manager. It integrates the tasks performed by computer applications with the everyday tasks of staff members.

In this preferred embodiment based on the IBM Flow-Mark workflow manager, workflow server 120 includes a buildtime module and a runtime module.

The buildtime module provides for defining, graphically depicting, and documenting models of the processes; assigning staff members to the activities in the processes; associating OS/2, AIX, and Windows programs with particular activities; and animating workflow models to test them.

Runtime module 122, also referred to as a workflow server or a Flowmark server, provides for starting processes that have been translated from buildtime; managing processes that are already started; starting activities that running processes make ready; transferring activities from one user's work list to another's; and tracking processes and the status of activities assigned to staff members.

FlowMark provides as many separate FlowMark databases as are needed. Upon logging on to the FlowMark workflow manager 120, the user specifies which databases are to be accessed. An advantage of multiple databases is that one database may be used for developing and testing workflow models, and another one use for executing tested models and operational processes.

Workflow server 120, such as the FlowMark workflow manager, normally runs as a distributed application on local area networks that consist of several workstations, in a client-server configuration. One or more workstations act as FLowMark servers, and the FlowMark clients run on other workstations. In accordance with other embodiments of the invention, a FlowMark server and its clients reside on one (stand-alone) workstation. Further, a set of API's 124 may be utilized to provide direct interaction with server 122 at runtime. As previously noted, in accordance with this invention, workflow server 120 is configured to operate on the internet.

As noted, the IBM FlowMark product is one example of a workflow server 120. It uses the FlowMark definition language (.fdl) to define processes. Other workflow products represent processes in different process definition languages. For example, the Action Technologies (AT) workflow product represents processes in .ama files. Yet other workflow servers include the IBM AS/400 Workflow Automation Facility (WAF), and FileNet.

Flowmark is an IBM workflow process server. The workflow management coalition (WFMC) is a client/server application, including a workflow server, and build time, run time and runtime execution clients.

The buildtime client constructs processes defining the flow and constructs of a work process, including activities, programs or processes, people, roles, and control data connectors.

The runtime client (an OS/2 model) is presented with a display that allows control of a list of processes that exist at the server. By clicking on an activity icon, the server will create and run the related process. The person's inbasket display may include a list of work items; by clicking on an entry, the program starts running that helps the person do the related job. These operations will be further described hereafter in connection with the example of FIGS. 10 through 20.

The runtime execution client invokes and executes programs.

2.3 Web Browser 130

WWW browser 130 may be any state of the art browser, such as the IBM Interconnect Connection Web Explorer (OS/2, AIX, Windows).

Referring further to FIGS. 6 and 7, and as will be described hereafter in connection with FIGS. 10–20, in accordance with the invention, an HTML page is provided for entering a process definition file name and corresponding common gateway interface (CGI) scripts 136, 164 and 166 to invoke the transformation mechanism 142 on the file named.

Browser 130 displays a list of selectable processes (table of contents) of the generated HTML pages (also referred to as files).

One of physical files 150 contains the input process definition language, and several output physical files 150 contain the HTML representation of those processes—and these are listed in the table of contents. Hypertext links are useful for browsing these several files 150.

Appropriate scripts (which are programs) are provided to view, edit and execute these process representations from a web browser. This assumes that the user has a viewer, ie, an HTML browser, because of the HTML representation—with this, the user can view, edit and execute processes via the web.

Figure 10:
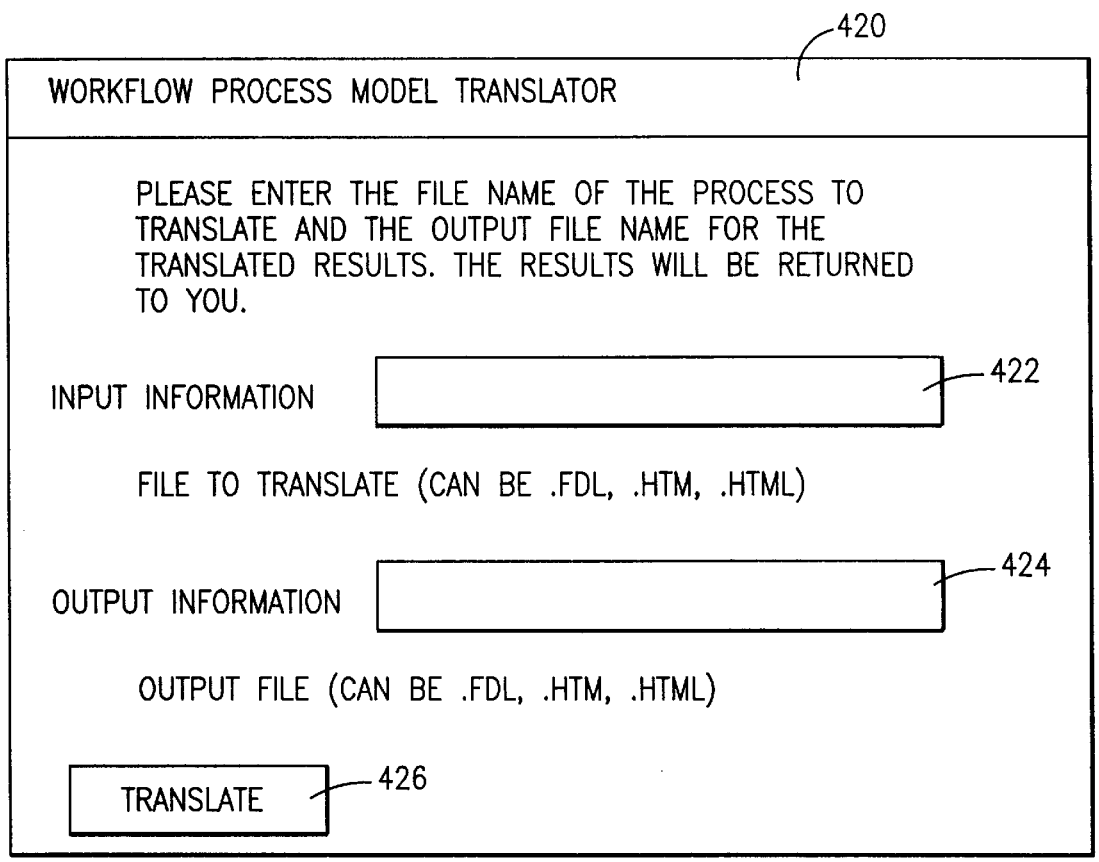
FIG. 10 is a representation of work station display for selecting a workflow process model translate function.

As will be described hereafter in connection with FIGS. 10 and 11, a first button 426 is provided at browser 130 which causes invocation of a translation process 142 on a user provided file name and a second button 436 is provided to edit a selected process. A selectable list of processes and means for selecting one of those processes for execution are provided as an HTML page in files 150. And, a third button 438 is provided for executing the selected process, by invoking a set of scripts 166 which, through APIs 124, causes workflow server 122 to execute the process

2.4 HTML Process Definition 150

HTML process definition 150 is a description of process 110 in the protocol by which information is exchanged between an HTTP server and a web browser. Such a description includes uniform resource locators (URLs), or hypertext markup language (HTML) tags, which are hot links to other documents, data, and programs that can be accessed using a web browser.

2.5 Web Server (HTTP Server) 160

Web server 160, including server 162, translate CGIs 164 and execute CGIs 166 may be an HTTP server such as IBM's Internet Connection Server (OS/2, AIX, AS/400, and OS/390); C.E.R.N. Server; NetScape; Microsoft Internet Server; etc. Translate CGI 164 includes the CGI scripts required to invoke front end 144 when button 426 (FIG. 9) is actuated A CGI script conveys the file names entered in fields 422 and 424 (FIG. 10) Execute CGIs 166 includes the CGI scripts necessary to cause server 122 to execute a process when button 438 (FIG. 11) is activated, and conveys process name 432 (FIG. 11) to server 122.

2.6 f(p) Transform 142

Referring further to FIGS. 6 and 7, transform 142, including f(p) 140 and fl(p) 170, provides a workflow process model translator. Transform 142, includes front end 144, process objects 149, backend 148, and HTML objects 152, all further described hereafter with respect to FIG. 8. As will be described hereafter in connection with FIGS. 7 and 8, transform 140 implements a process whereby web flow server 160 and workflow server 120 both participate in process definition 150.

Transformation mechanism f(p) 140 transforms a workflow process representation to the hypertext markup language (HTML). In this preferred embodiment, transform 140 is a computer implemented process including a first slice (or pass) through front end 144, modeler 149, and backend 148, whereas inverse transform fl(p) 170 is a second slice there through. These slices are described in greater detail with respect to FIG. 8.

Figure 8:
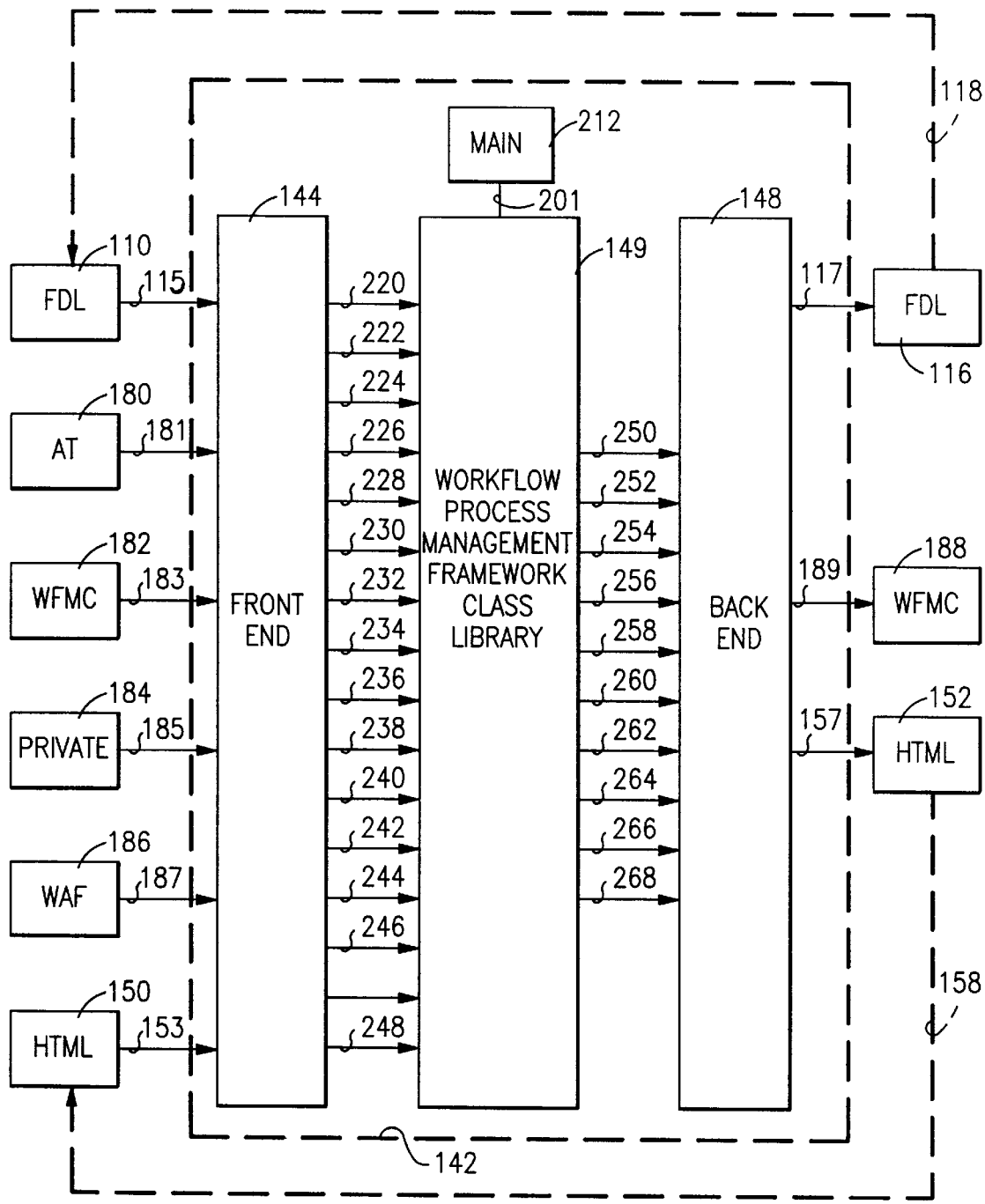
FIG. 8 is a block diagram of the workflow process model translator of the invention.

Referring now to FIG. 8, the workflow process model translator, or transform 142, of the invention provides a computer implemented process whereby web flow servers 160 and workflow servers 120 both participate in process definition 150. By way of introduction to the function of translate 142, in a computer implemented process for building an HTML statement 152 of a workflow process from an FDL statement 110 (description of that workflow process), front end processor 144

1. scans in the FDL input code 110;
2. parses the FDL code string to identify lexical units, or tokens;
3. issues calls 220–248 based thereon to modeler 149 (also variously referred to as middle end 149, also as SOM process objects 149, and also as workflow process management framework class library 149);

and modeler 149 (ie, the middle end):

4. builds a dynamic (ie, in memory 212) process module;

5. restructures the model for easier access, such as by reorganizing pointers;

and back end 148:

6. builds HTML objects 152 from the module.

Front end processor 144 includes yet another compiler, a yacc grammar for FlowMark Definition Language (fdl), including grammars for process, structure, program, location, OS2, minimized, person, role, organization, level, network node.

Referring to FIG. 8, in accordance with the concept of functional partitioning, the function of the modeler is to build a language independent and system independent representation of the process model. In one preferred embodiment of the invention, modeler 149 is responsive to the following modeler calls on the input end:

build process 220
build datastructure 222
build activity 224
build node settings 226
build programs 228
build description 230
build attributes 232
build organization 234
build person 236
build block 238
build sub process 240
build role 242
build level 244
build subentity 246
build connector 248

Modeler 149 calls 250–268 on the output end include get (to define position) and next (to iterate calls). (This is the object oriented equivalent of an iterator.) Back end 148 builds pages from, and may access the same data in the modeler across various pages—thus driving the modeler to give it the information required to build the desired output pages. Specific codes may be included to format and "make pretty" the output pages.

Whereas a separate front end 144 is designed for each input language FDL 110, AT 180, WFMC 182, private 184, WAF 186 and HTML 150, modeler calls 220–248 are the same. The input code 115, 181, 183, 185, 187, 153, respectively, can be a language or a report, both of which can be translated by generating models in modeler 149.

In one use of the invention, a user may submit an FDL statement 110 of the workflow for a first pass or slice through translator 142 where it is translated to HTML 152, modify the HTML 152 code (as is represented by line 158) into HTML code 150 which he resubmits, as is represented by line 153 for a second pass through processor 142 to generate modified FDL code 116 which can be executed by a workflow server.

2.6.1 Scan and Parse (Front End) 144

Front end 144 scans and parses input files 110, 180, 182, 184, 186 or 150, as the case may be. Other examples are WFMC 182 and WAF 186 and Action Technologies ama files (not shown) Also, HTML 150 representations which result from a previous pass through the transformation mechanism 142, are scanned and parsed so as to be reformatted and transformed to provide hypertext links, browseability.

Front end 144, using the yacc grammar for the appropriate input, say FDL 110, parses the input and issues calls 220–248, referred to as front-end methods. The syntax and function of these calls are as follows:

Build process 220:
  void BuildProcess(in string Name);
  An object representing a process is requested by method call build process 220. The process name is the sole input. This call may be made independently of the others Later calls will add information to this object, or new objects associated with the process object.

Build datastructure 222:
  void BuildDataStructure(in string Name,in DataStructureType t);
  A datastructure object is built by this call. Initially it has only a name and type (input, output, declaration). This call is independent of any previous call.

Build activity 224:
  void BuildActivity(in string Name, in ActivityType type);
  An activity object is built, with a name and a type (program activity, process activity, block activity). It is automatically associated with the most recently built process object. (A process object may have multiple activity objects.)

Build node settings 226:
  void BuildNodeSetting(in string nodeSet, in short type);
  Builds a node setting object, which contains information about the a process node (activity). The node setting object is associated with the most recently build activity object. A node setting may contain such information as start options, a process name, exit options, layout options (of an icon for the node on a physical display), name of input and output container, duration, etc.

Build program 228:
  void BuildProgram(in string Name);
  Builds a program object with a unique name. Activity objects 224 reference program objects 228.

Build description 230:
  void BuildDescription(in string Des);
  Builds a description object. This is automatically associated with the most recently built object (of any kind ).

Build attribute 232:
  void BuildAttribute(in short attrName, in string value);
  Builds an attribute object. This is a generic way of handling various kinds of attributes other objects might have, and is open ended. The attributes are named, and a value is supplied The attribute object is associated with the most recently supplied object (of any kind).

Build organization 234:
  void BuildOrganization(in string Name);
  Builds an organization object with a unique name. Activity objects 224 reference these by name.

Build person 236:
  void BuildPerson(in string Name);
  Builds a person object with a unique name. Activity objects 224 reference these by name.

Build role 242:
  void BuildRole(in string Name);
  Builds a role object with a unique name. Activity objects 224 reference these by name.

Build subentity 246:
  void BuildSubEntity(in short type);
  Builds a subentity object. Both primary objects and subentities 246 may have attributes 232. Subentity objects 246 are used to cluster attributes 232 within primary objects.

Build connector 248:
  void BuildConnector(in string ltAct, in string rtAct, in short type);
  Builds a connector object. The types are control and data. They associate 2 activity objects 224 (it and rt, representing 'left' and 'right' respectively) It is the collection of these objects which define the 'flow' of control or data through each process.

Build block 238:
 void BuildBlock(in string Name);
 Builds a block object with a unique name (within object type). A block object is used to group process objects 220.
Build sub process 240:
 void BuildSubProcess(in string Name);
 Builds a subprocess object. This object type works like a subentity 246 except it is process-specific with respect to possible attributes 232.
Build level 224:
 void BuildLevel(in short lvl);
 Builds a level object with a unique name. Activity objects 224 reference these by name.

2.6.2 Internal Representation 149

The primary function of workflow process management framework class library 149 is to generate a model of a process that includes all the sub-processes, activities, attributes, dataflow, and so forth for that process Responsive to calls 220–248, library 149 builds a language independent representation of process 110, 180, 182, 184, 186, 150, as the case may be.

This operation is understood with respect to the example of Table 1, a FlowMark process to do an OS2Tree function.

TABLE 1

FLOWMARK PROCESS: INPUT TO FDL FRONT-END

```
/****************************************************
* Example of a FlowMark process to do an OS2Tree
* function.
*
****************************************************/
CODEPAGE 437
/****************************************************
*
* PROCESSES
*
****************************************************/
/****************************************************
* Description of Process PTreeTst
****************************************************/
PROCESS    'PTreeTst' ( 'Default Data Structure',
                        'Default Data Structure')
   DESCRIPTION 'A simple process, 1 activity, that
                does an OS/2 tree'
LAYOUT    GIVEN
    WINDOW '4111 131 133 797 512 4119 0 0 0 0 100 0
           0 4 1 0'
PROGRAM ACTIVITY 'Simple Dumb TREE'
                 ('Default Data Structure',
                  'Default Data Structure')
    DESCRIPTION 'Run TREE command for directory
                 structure'
    PROGRAM 'os2tree'
    START AUTOMATIC WHEN AT_LEAST_ONE CONNECTOR
    TRUE
      LAYOUT XPOS=-135 YPOS=80
    END 'OS2 TREE'
/****************************************************/
```

An example front end 144 written to parse FDL 110, responsive to the input of Table 1 on line 115, makes the calls listed in Table 2, where attributes, values, processes, datastructure, and so forth, are all tied to an entity Default process 270 is created upon the first invocation of build call.

TABLE 2

FDL FRONT END

```
/****************************************************/
BuildAttribute(fdlCODEPAGE,437);
Buildprocess ("PTreeTst");
BuildDatastructure("Default Data Structure",1);
      // 1 referring to input datastructure
BuildDatastructure("Default Data Structure",2);
      // 2 referring to output datastructure
BuildDescription('A simple process, 1 activity,
that does an OS/2 tree');
BuildAttribute(fdlGIVEN,"<no_value>");
BuildAttribute(fdlWINDOW,"4111 131 133 797 512 4119 0 0
0 0 100 0 0 4 1 0")
BuildActivity("Simple Dumb TREE",1);
      // 1 referring to program activity
BuildDatastructure("Default Data Structure",1);
      // 1 referring to input datastructure
BuildDatastructure("Default Data Structure",2);
      // 2 referring to output datastructure
BuildDescription("Run Tree command for directory
structure");
BuildAttribute(fdlPROGRAMA, 'os2tree');
BuildAttribute( fdlSTART,AUTOMATIC);
BuildAttribute( fdlNONE, "AT_LEAST_ONE");
BuildAttribute( fdlNONE, "CONNECTOR");
```

TABLE 2-continued

FDL FRONT END

```
BuildAttribute( fdlPOSITION, "-135");
BuildAttribute( fdlNONE, "80");
/****************************************************/
```

Figure 9A:
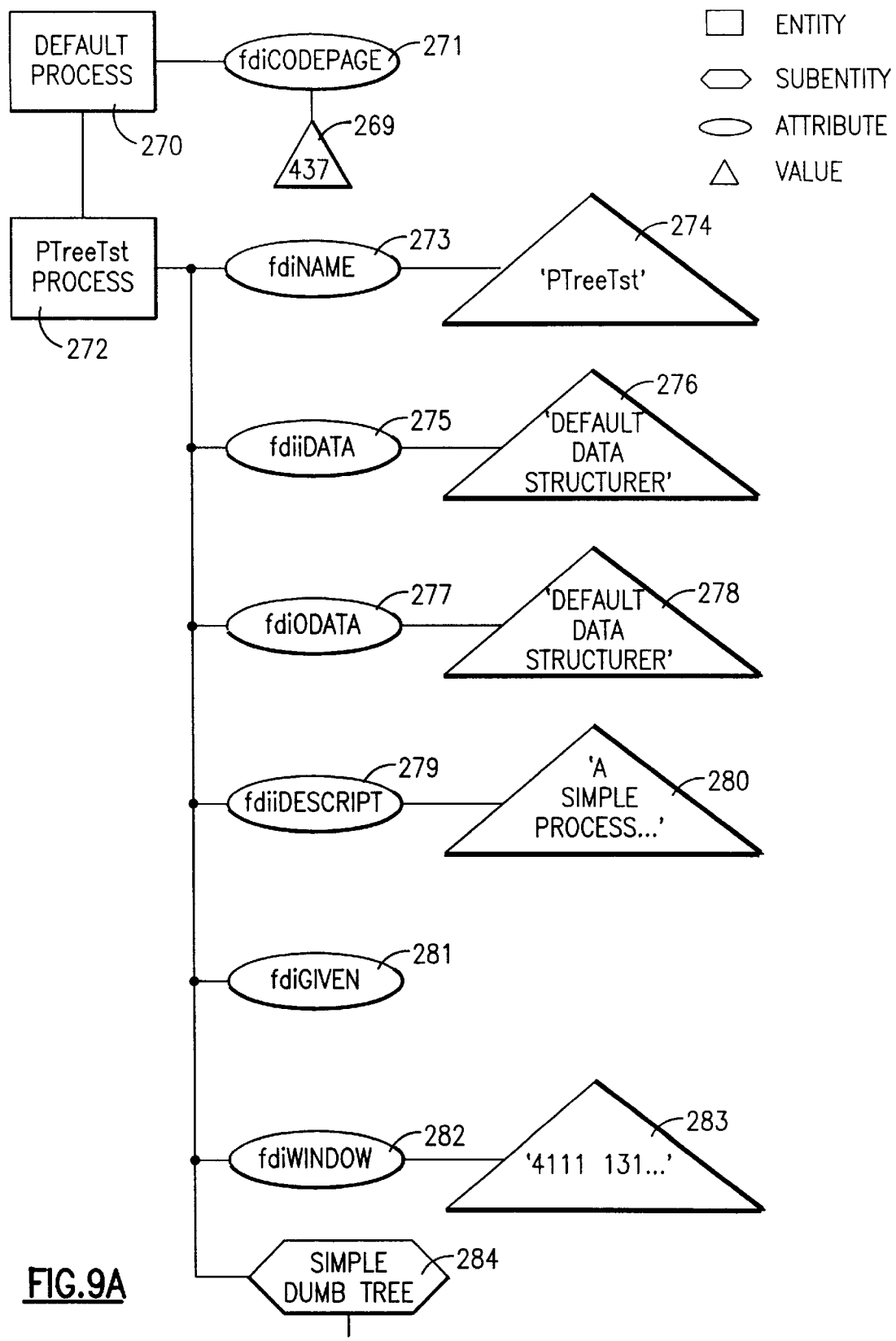
FIG. 9 is a diagrammatic illustration of an internal data model resulting from completion of a set of front-end calls.
Figure 9B:
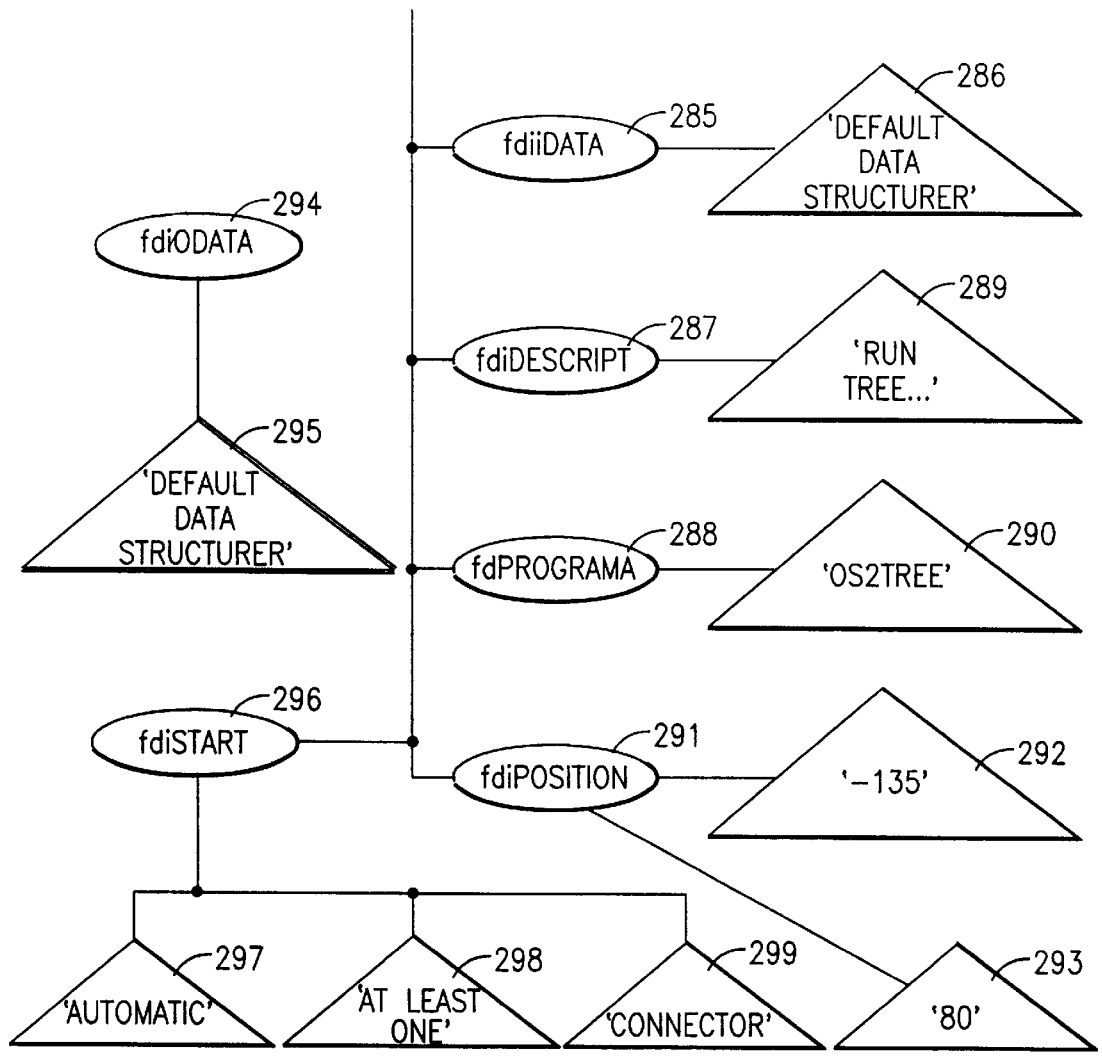
Figure 9:
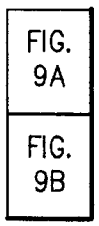

Referring to FIG. 9, the internal data model resulting from the completion of processing with modeler 149 of the front-end calls of Table 2 is set forth. Internal data instrumentation keeps track of where it is and how each build call applies In FIG. 9, default process entity 270 has attribute fdlCodepage 271 of value 437, represented by value block 269. PTreeTst Process entity 272 has attributes fdlNAME 273 273 with value 274 of "PTreeTst", fdlIDATA 275 with value 276 of "Default Data Structure", fdlODATA 277 with value 278 of "Default Data Structure", fdlDESCRPT 279 with value 280 of "A simple process . . . ", fdGIVEN 281, fdlWINDOW 282 with value 283 of "4111 131 . . . ". PTreeTst Process entity 272 also has Simple Dumb Tree subentity 284, which has attributes fdlIDATA 285 with value 286 of "Default Data Structure", fdlDESCRPT 287 with value 283 of "Run Tree . . . ", fdPROGRAMA 288 with value 290 of "OS2Tree", fdlPOSITION 291 with values 292 of "−135", and 293 of "80", fdlODATA 294 with value 295 of "Default Data Structure", and fdlSTART 296 with values 297, 298 and 299 of "Augtomatic", "At Least one", and "Connector", respectively.

In operation, before calling any build calls, the front-end 144 instantiates a process builder object that is, a new wfbuild. This instantiation of the process builder causes the center-end to create a process object 270 where the subsequent attributes (that is, BuildAttribute (fdlCODEPAGE, 437)) 271 will be contained. The center-end handles build information as objects Thus, for each build call the center-end creates an object representing the type of build request and attaches it to the appropriate owning object by way of a linked list contained in the owning object, as shown in FIG. 9. The owning object is determined by the process builder object based on the rules for the FlowMark Process Definition Language (FDL). Therefore, the process builder class, implemented in the center-end, supplies well-defined build interfaces for front ends (i.e., FDL parser) and hides the complexity from the front-ends of how a process or processes are represented in the internal model.

Back-end 148 uses a set a well-defined iterator interfaces that also hide the complexity and representation of center-end 149. This allows for an extensible and easily enhanced center-end 149 as the FDL changes Also, center-end 149 can be replaced independently of front-end 144 or back-end 148. Backend interfaces 250–268, or iterators to be described hereafter, supplied by center-end 149 provide a data model independent way of traversing the center-end's representation of the process or processes parsed by front-end 144.

Referring to Table 3, an example FDL backend 148 processes the model of FIG. 9. Except for formatting (that is, comment lines, indentations, and so forth), the end result 116 of the FDL backend 148 should be identical to that of the front end 144 FDL 110.

TABLE 3

BACK-END EXAMPLE

```
/*******************************************/
CreateEntityIterator(ev,fdlPROCESS);
        //always created for the default process.
CreateAttributeIterator(ev,fdlCODEPAGE);
        //check for a code page.
NextAttributevalue();
        //retrieves code page number 437.
NextAttributevalue();
        //returns no value found.
NextAttribute();
        //returns no value found.
```

TABLE 3-continued

BACK-END EXAMPLE

```
NextEntity(ev,fdlPROCESS);
        //create a subentity iterator for 1st real
//entity
CreatAttributeIterator (ev,fdlNAME);
NextAttributeValue();
        //returns PtreeTst.
NextAttributevalue();
        //returns no value found.
NextAttribute();
        //fdlIDATA.
NextAttributeValue();
        //returns 'Default Data structure'.
NextAttributeValue();
        //returns no value found.
NextAttribute();
        //fdlODATA.
NextAttributeValue();
        //returns 'Default Data structure'.
NextAttributeValue();
        //returns no value found.
NextAttribute();
        //fdlIDESCRPT.
NextAttributeValue();
        //returns 'A Simple Process. . . '.
NextAttributeValue();
        //returns no value found.
NextAttribute();
        //fldGIVEN.
NextAttributeValue();
        //returns no value found.
NextAttribute();
        //fdlWINDOW.
NextAttributeValue();
        //returns '4111 131. . . '.
NextAttributeValue();
        //returns no value found.
NextAttribute();
        //returns no value found.
CreateSubEntityIterator(ev,fdlPROCESS);
        //Current subentity is fdlPRCACT.
CreatAttributeIterator(ev,fdlNAME);
NextAttributeValue();
        //returns 'A Simple Dumb Tree'.
NextAttributeValue();
        //returns no value found.
NextAttribute();
        //fdlIDATA.
NextAttributeValue();
        //returns 'DefaultData structure'.
NextAttributeValue();
        //returns no value found.
NextAttribute();
        //fdlODATA.
NextAttributeValue();
        //returns "Default Data structure'.
NextAttributeValue();
        //returns no value found.
NextAttribute();
        //fdlIDESCRPT.
NextAttributeValue();
        //returns "Runs Tree. . . '.
NextAttributeValue();
        //returns no value found.
NextAttribute();
        //fdlPROGRAMA.
NextAttributeValue();
        //returns 'OS2TREE'.
NextAttributeValue();
        //returns no value found.
NextAttribute();
        //fdlSTART.
NextAttributeValue();
        //returns 'AUTOMATIC'.
NextAttributeValue();
        //returns 'AT_LEAST_ONE'.
NextAttributeValue();
        //returns 'CONNECTOR'
```

TABLE 3-continued

BACK-END EXAMPLE

NextAttributeValue();
    //returns no value found.
NextAttribute();
    //fdlPOSITION.
NextAttributeValue();
    //returns '-135'.
NextAttributeValue();
    //returns '80'.
NextAttributeValue();
    //returns no value found.
/****************************************************/

2.6.3 HTML Process Representation (Back End)

Backend 148 generates an output based upon the model. The first pass through this transformation must have as an input (to front end 144) a process definition language—technical content about processes. The output 177, 189, 157 of this step is an HTML 152 output (or FDL 116 or WFMC 188) which can be fed back to step one, as is represented by lines 118 and 158.

The methods described below that make up the back-end methods 250–268 work on linked lists that were created by the front-end methods 220-248 previously described.

Back-end method descriptions
    void set_processBuilder (in WfProcessBuilder processBuilder);
        Set_processBuilder 250 creates a linked list iterator to iterate the linked list of processes that was built using the front-end methods 220–248. Next, it initializes the first process to start on using the iterator created earlier.
    short CreateEntityIterator(in short Name);
        CreatEntityIterator 252 creates an entity specific iterator that can be one of the following
            Process (case fdlPRO(.ESS)
            Structure (case fdlSrjRUCTURE)
            Program (case fdlPRO(;RAM)
            Role (case fdlROLE)
            Person (case fdlPERSON)
            Organization (case fdlORG)
            Level (case fdlLEVEL)
        These entity specific iterators are derived from the Flowmark Definition Language (FDL). The iterator is used to traverse the linked list of entities that represent the iterator type. These entities were created by the corresponding builder class and are tied to the current process that is being built.
    short NextEntity( );
        NextEntity 254 moves the entity specific iterator to the next appropriate entity in the linked list of objects The traversing (movement to the next object) is based on the entity type (ibe. process, structure, etc.).
    short CreateSubEntityIterator(in short Name);
        CreateSubEntityIterator 256 creates a subenuty (or child) specific iterator. For example, of the following;
            Process Activity (case fdlPRCACT)
            Program Activity (case fdlPGMACT)
            Block Activity (case fdlBLKACT)
        These subentity specific iterators are derived from the Flowmark Definition Language (FDL) and are child components of a specific FDL language construct. The iterator is to traverse the linked list of child entities that represent the iterator type. These subentities were created by the corresponding builder class and are tied to the current entity that was being built.
    short NextSubEntity( );
        NextSubEntity 258 moves the subentity specific iterator to the next appropriate child subentity in the linked list of subentity (child) objects. The traversing (movement to the next object) is based on the subentity type (i.e. process activity, program activity, etc.).
    short CreateSubSubEntityIterator(in short Name);
        CreateSubSubEntityIteraltor 260 creates a subsubentity (grandchild) specific iterator. The only current grandchild iterator type is:
            Done By clause (case fdlDONEBY)
        This subsubentity specific iterator is derived from the Flowmark Definition Language (FDL) and is a grandchild component of a specific FDL language constructs The iterator is used to traverse the linked list of grandchild entities that represent the iterator type. These subsubentities are created by the corresponding builder class and are tied to the current subentity that is being built.
    short NextSubSubEntity( );
        NextSubSubEntity 262 moves the subsubentity specific iterator to the next appropriate grandchild subsubentity in the linked list of subsubentity (grandchild) objects The traversing (movement to the next object) is based on the subsubentity type (i.e., done by in node setting object).
    short CreateAttributeIterator(in short Name);
        CreateAttributeIterator 264 creates an attribute specific iterator for either an entity or a subentity. The attribute iterator can be one of the following.
            Name (case fdlNAME)
            Data Structure
            Input or Output (case fdlIDATA or fdlODATA)
            Process (case fdlPR.OCESS)
            Program (case fdlPR.OGRAM)
            Role (case fdlROLE)
            Person (case fdlPERSON)
            Organization (case fdlORG)
            Level (case fdlLEVEL)
            Process Activity (case fdlPRCACT)
            Program Activity (case fdlPGMACT)
            Block Activity (case fdlBLKACT)
            OS/2 (case fdlOS2)
            AIX (case fdlAIX)
            Windows (case fdlWINDOWS)
            Member (case fdlMEM.BER)
            Done by (case fdlDONEBY)
            Control connector (case fdlCCONNECTOR)
            Data connector (case fdlDCONNECTOR)
        These attribute specific iterators are derived from the Flowmark Definition Language (FDL) attributes for a specific entity or subentity. The iterator is used to traverse the linked list of attributes for the appropriate entity or subentity.
    short NextAttribute( );
        NextAttribute 266 moves the attribute specific iterator to the next appropriate attribute object in the linked list of attributes for the either the entity or subsubentity (grandchild) objects.
    string NextAttributeValue( );
        NextAttributeValue 268 returns the attribute value for the current attribute being iterated. It also contains the logic to distinguish whether the attribute value comes from the current attribute being iterated or a specific entity (process, data structure input or output, program) or subentity (activity).

2.6.4 f'(p) Inverse Transform 170

Inverse transform f'(p) 170 is a mechanism for transforming from HTML, or any other process definition language which has resulted from f(p) transformation of a process definition file (first slice), to a process representation that a selected workflow server can use.

In this preferred embodiment, inverse transform f'(p) 170 is a computer implemented process including a second slice through front end 144, modeler (also referred to as class library) 149, and backend 148.

Front end 144 scans and parses the input from, say, HTML 150 on line 153. Front end 144 must understand the syntax of each process definition language (PDL) 110, 180, 182, 184, 186 and 150. The inverse translation slice is any PDL to process modeler to HTML, or any PDL to any PDL. HTML is not a process definition language per se, but is the format resulting from a first slice of transformation mechanism f(p), which translated the original process definition language to HTML. It is that HTML 152 output 150 on which the inverse translation is done. That is, the HTML 150 into front end 144 on a second, or f(p) slice, must be an HTML 152 previously generated as output from 148. The process of the invention does not take any HTML page, go through the transform, and come out with an executable process.

As with transform f(p), inverse transform f'(p) provides a representation in an internal model of the processes represented in, say, the HTML language; including a first set of class definitions that represent generic process characteristics; a second set of classes that define relationships among the first set of classes; a set of utility classes that provide for ease of generation of the HTML text; a set of class methods that allow the model to be dynamically constructed as the scanning and parsing occurs; a second set of class methods (at the backend) for navigating and extracting process information (names, attributes, descriptions, definitions, relationships, etc.) from the model; and a means for generating process definition language output based upon the model. A model is a dynamic memory structure that represents the process, relationships, definitions, names, attributes, and other characteristics useful to know about a process—this model could be flattened out to a file to speed up later processing.

These transformations, and corresponding process representations, need not be the same—that is, we may go from a first process representation to HTML, and from HTML to a second process representation For example, processing could be FlowMark 110 to HTML 152, and from HTML 150 to filenet (not shown) or WFMC 188.

3. Method of Operation. Viewing, Editing and Executing Workflow Processes

In accordance with a method of this invention a workflow server is accessed and executed on the internet by: (1) starting the web browser; (2) pointing to a URL, the home address of the server that hosts the HTML process definitions; (3) selecting from the browser a process to view, edit or execute; (4) if viewing, then browsing (examining) the process; (5) if editing, then browsing and modifying the process by selecting the process and running a script to modify the process; (6) if executing, then selecting the appropriate workflow server and process to execute by selecting a process and server and running a script to transform the process from,, say, HTML to the appropriate server representation, and start that process on the server; and (7) depending upon the selected process definition, executing the selected workflow process.

Referring to FIGS. 9–19, an example of the invention illustrating internet access to a workflow process model will be described.

Referring to FIG. 9, a user at a workstation on the internet brings up panel 420, which prompts him to enter the workflow file 422 to be translated, and the name 424 of the file to receive the results. By activating button 426, the workflow process model translator is initiated. Referring to FIG. 10, panel 430 appears, prompting the user to select a process 432 and a server 434 from the list of those available. Button 436 is activated to edit, and button 438 activated to execute, the selected process 432 using server 434. For purpose off this example, assume that the user selects process 'NewEmployee'.

Figure 11:
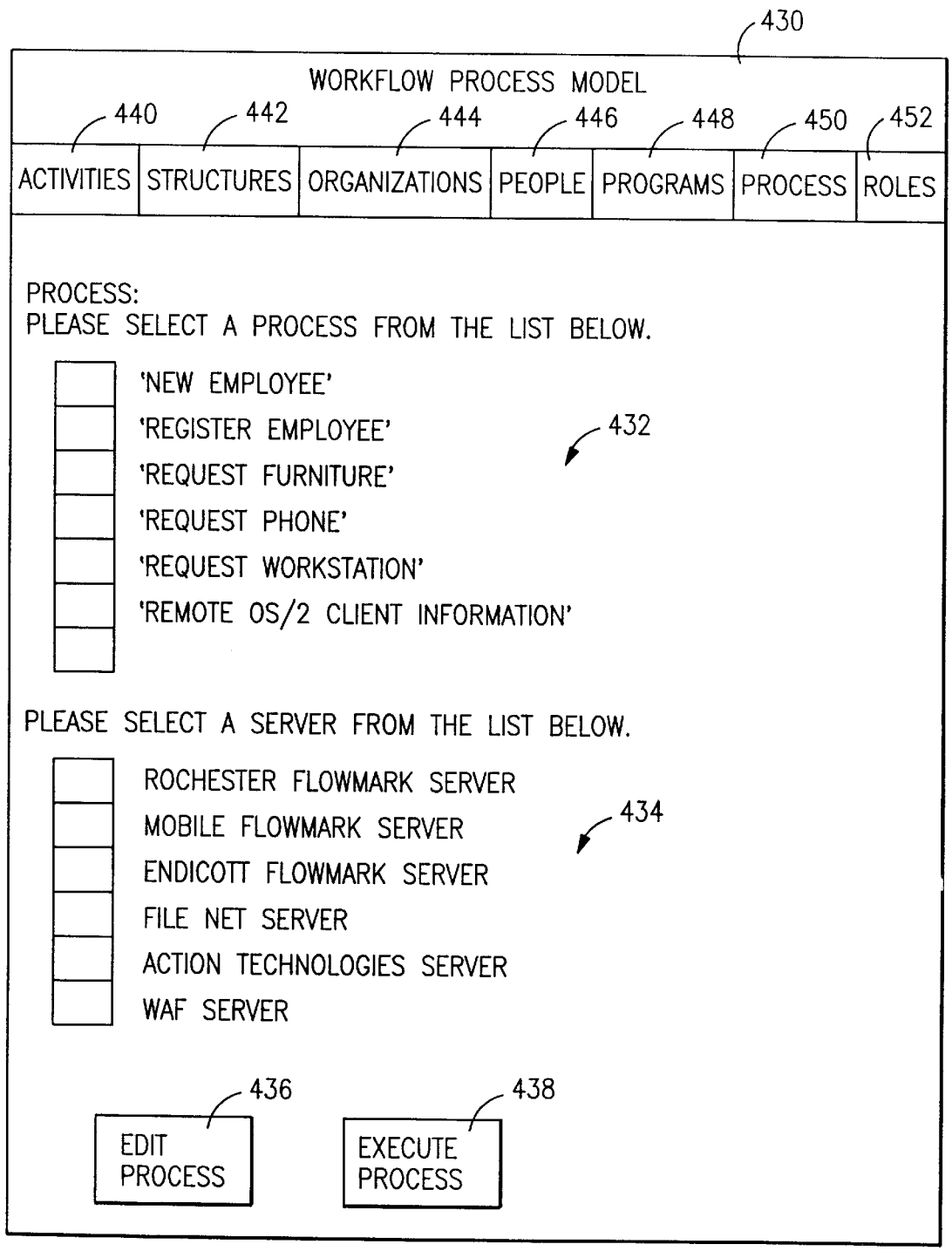
FIG. 11 is a representation of a workflow process model workstation screen display for selecting a process and a server.
Figure 12:
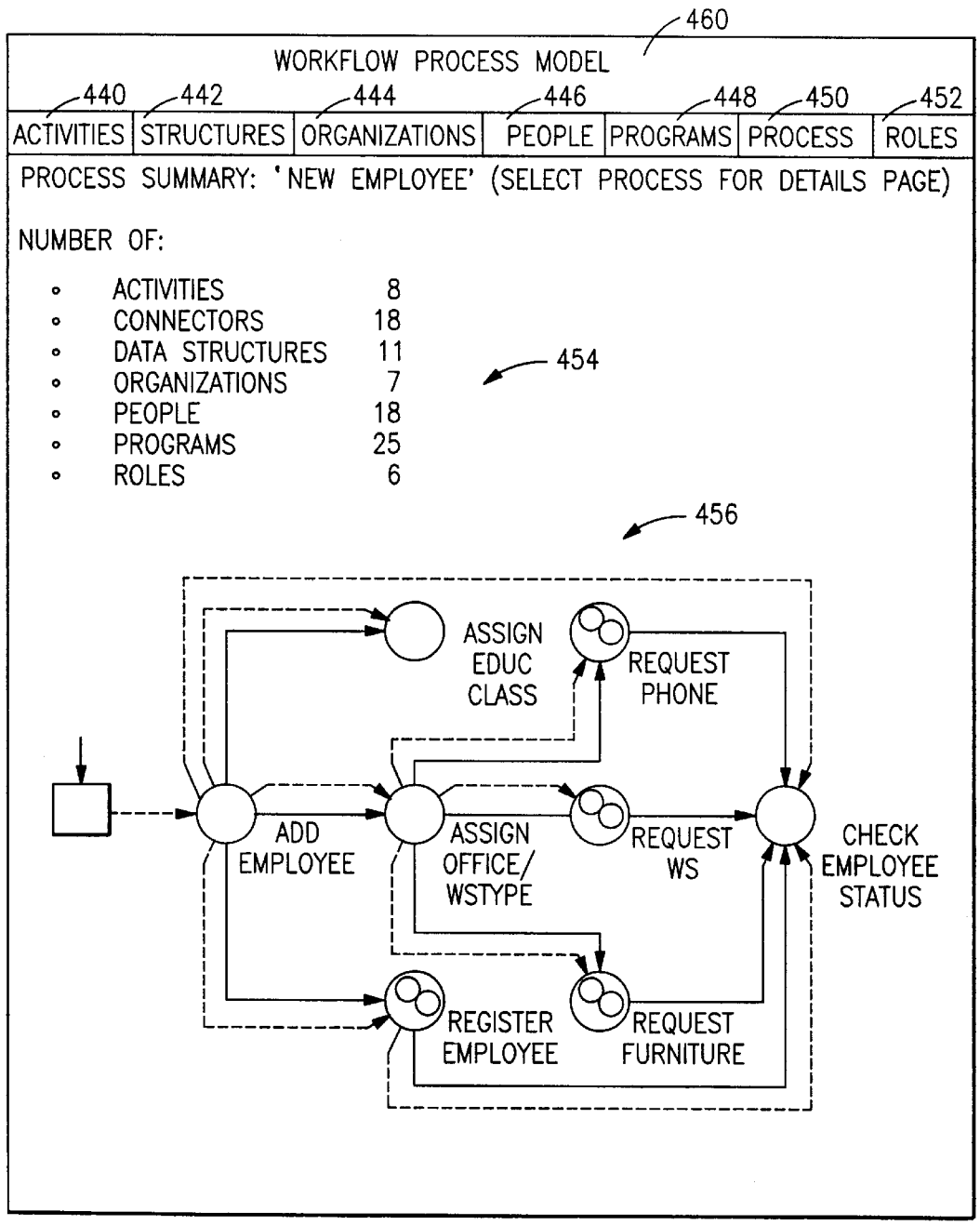
FIG. 12 is a representation of a workflow process model process summary and graphical display.

Referring to FIG. 11, display 460 provides a summary 454 of process 'NewEmployee', and a graphical representation 456 thereof. Selection buttons 440–452 are provided, and by clicking on button 440, a user may select a pull-down display of activities, button 442 for a pull-down display of structures, button 444 for organizations, button 446 for people, button 448 for programs, button 450 for process details, and button 452 for roles. Referring to FIGS. 12–19, process detail panels and pull-down panels are illustrated for steps or activities 462, connectors 464, structures 466, people 468, roles 470, organizations 472, programs 474, and activities 476, respectively.

In accordance with an examplary embodiment of the invention, a workflow server on the internet includes the following: a transformation mechanism 142 for transforming a vendors process 110, 18, 182, 184, 186, 150 representation to an intermediate representation, such as FDL 116 or HTML 152; transformation mechanism 142 including front end 144 for scanning and parsing a process definition language string 115, 181, 183, 185, 187 or 153; middle end 149 for representing an internal model of the processes represented in the process definition language, middle end 149 including a first set of class definitions that represent generic process characteristics, a second set of classes that define relationships among the first set of classes, and a set of utility classes that provide for ease of generation of the HTML text; middle end 149 further including a set of class methods 220–248 that allow the model to be dynamically constructed as the scanning and parsing occurs in front end 144, and a second set of class methods 250–268 at the back end for navigating and extracting process information (names, attributes, descriptions, definitions, relationships, etc.) from the model; a backend 148 for generating FDL 116 or HTML 152 output, as the case may be, based upon the model; and an inverse transformation mechanism f'(p) from the process definition language, to a process representation that a workflow server can use; the inverse transformation mechanism f'(p) being implemented as a second pass through transformation mechanism 142.

In accordance with a further aspect of the invention, a method for using a workflow server on the internet includes the following steps: providing an appropriate HTML page 430 for entering a process definition file name 432 and corresponding CGI scripts to invoke the transformation mechanism on the file named; providing a means 450 to immediately browse a list of selectable processes of the generated HTML pages; providing appropriate scripts to view, edit and execute these process representations from a web browser; providing a first button 436 for editing a file being browsed, to invoke a CGI script, or some other browser invocable script, thus starting the user selectable editor; providing a selectable list 462 of processes, and means for selecting a process for execution; providing a second button 438 for invoking the selected process, to invoke two sets of scripts, one CGI script for translating and generating a process definition file based upon the HTML file selected from the list of processes, and a second CGI script, or some other browser invocable script, for submitting a process definition file to a workflow server including the generated process definition file for execution by the server; providing a workflow server 120; providing an HTTP server 160; providing a WWW browser 130; starting the web browser 130; pointing to a URL, the home address 434 of the server that hosts the HTML process definitions 150; selecting from the browser a process 432 to view, edit or execute; if viewing, then browsing the process; if editing 436, then browsing and modifying the process, such that a process is selected and a script is run to modify the process; if executing 438, then selecting the appropriate workflow server and process to execute; such that a process and server are selected and a script is run to transform the process from HTML to the appropriate server representation, and start that process on the server; depending upon the selected process definition, executing the selected workflow process.

Advantages over the Prior Art

The advantages of the method of the preferred embodiment of this invention include:

A conversion facility is provided for converting Flow-Mark definition language (.fdl) files to hypertext markup language (HTML), a tagged markup language typically stored as an ascii file, the language of documents on the internet. Net browsers read HTML. (The protocol for transferring information on the internet is HTTP.) Typically, a browser will request a document, the server responds with an HTML document, and the browser interprets and displays the received document. Documents, as displayed, have anchor tags—a highlighted word or icon with associated hot links to another piece of information.

In accordance with this invention, by constructing a workflow definition using HTML syntax, hot links are provided to related processes (or, in FlowMark, activities.) Thus, HTML fits the workflow problem better than its current implementation (without such hot links.) Further, by thus marrying workflow and web, the naturally distributed nature of the web improves upon the current FlowMark capability of logging on to one server at; a time, the universe of supported web servers is extended, and the client base is normalized to HTML—the standard language of web browsers.

Alternative Embodiments

It will be appreciated that, although specific preferred and alternative embodiments of the invention have been described herein for purposes of illustration, various further modifications may be made without departing from the spirit and scope of the invention. For example, while reference has been made to the internet, this should be interpretted to include such facilities as may be provided within an enterprise, or on the intranet. Further, the invention can be implemented on a computer readable medium as electrical signals (including optical or other such signals) for controlling the operation of the computer in accordance with the method of the invention, or for structuring the computer hardware in accordance with the apparatus of the invention.

Accordingly the scope of protection of this invention is limited only by the following claims and their equivalents

We claim:

1. A computer implemented method for building a workflow or process definition statement from a process definition or workflow statement, respectively, comprising the steps of:

operating a front end processor to scan in an input code string; parse said code string to identify lexical tokens; and, issue modeler input calls based upon said tokens;

operating a modeler responsive to said modeler input calls to build a dynamic process module and restructure the model for easier access; and operating a back end processor to issue modeler output calls to build output pages, executable as hyperlink text by a web browser, from said module.

2. The method of claim 1, comprising the further steps of:

modifying said output pages to generate a modified code string;

operating said front end processor, modeler and back end processor to generate from said modified code string a set of modified output pages selectively in the syntax of said input code string or in another syntax.

3. A method for automating the translation of workflow representations, comprising the steps of generating a collection of processes defining a business workflow in the language of a workflow representation selected from a first set of workflow representations;

transforming said collection to a set of hypertext pages representing said processes in the language of a workflow representation selected from a second set of workflow representations;

operating a web browser to access said hypertext pages via a web flow server; and selectively editing or executing said processes.

4. The method of claim 3 wherein the step of executing said process comprises the steps of (1) responsive to any editing of said processes, inverse transforming the related hypertext pages to the language of a workflow server, and (2) invoking the process on the workflow server.

5. The method of claim 3 comprising the further step of providing hot links within the hypertext pages for providing anchor tags to related processes.

6. The method of claim 5 wherein said hypertext pages are html pages and said web flow server is an http server.

7. The method of claim 4, wherein said generating step operates on a process in accordance with a first process definition language, and wherein said executing step operates on a process in accordance with a second process definition language.

8. A workflow processing method, comprising the steps of describing a workflow process in the language of a first workflow process modeler to provide a first process definition;

translating said first process definition into a hypertext markup representation of said workflow process in the language of a second workflow process modeler; and responsive to a web browser request, selectively providing said hypertext markup representation to a user for access and selective modification.

9. The method of claim 8, further comprising the steps of inverse translating said hypertext markup representation, selectively as modified, into the language of a second workflow process modeler; and invoking and executing said workflow process in accordance with said second workflow process modeler.

10. The method of claim 9, said invoking and executing step further comprising:

displaying at a runtime client a list of existing processes;

responsive to user selection of one of said existing processes, displaying a list of work items in said users inbasket;

responsive to user selection of one of the listed work items, executing a related job.

11. The method of claim 10, wherein said runtime client is a web browser, said browser operable for displaying a first button for causing invocation of a translation process on a user provided file name, a second button for enabling editing of a selected process, and a third button for enabling invoking execution of said selected process.

12. A workflow processing method, comprising the steps of describing a workflow process in the language of a first workflow process modeler to provide a first process definition;

translating said first process definition into a hypertext markup representation of said workflow process;

responsive to a web browser request, selectively providing said hypertext markup representation to a user for access and selective modification;

inverse translating said hypertext markup representation, selectively as modified, into the language of a second workflow process modeler;

invoking and executing said workflow process in accordance with said second workflow process modeler; and wherein the languages of said first workflow process modeler and said second workflow process modeler are dissimilar.

13. A computer implemented method for building a workflow or process definition statement from a process definition or workflow statement, respectively, comprising the steps of:

operating a front end processor to scan in an input code string; parse said code string to identify lexical tokens; and, issue modeler input calls based upon said tokens;

operating a modeler responsive to said modeler input calls to build a dynamic process module and restructure the model for easier access;

operating a back end processor to issue modeler output calls to build output pages from said module;

modifying said output pages to generate a modified code string;

operating said front end processor, modeler and back end processor to generate from said modified code string a set of modified output pages in the syntax of said input code string;

operating a web server responsive to actuation of a first button to invoke said front end processor; and operating said web server responsive to actuation of a second button to execute the workflow process defined by said modified output pages.

14. A computer implemented process for operating a web flow server and at least one workflow server for defining and executing a workflow process, comprising the steps of:

providing a first representation of a workflow process in the language of a workflow server;

operating a front end processor to scan in said first representation, identify said language as one of a plurality of languages capable of parsing by said front end processor, parse said first representation to identify lexical units, and issue calls based on said lexical units;

operating a modeler to build from said calls a dynamic process module; and operating a back end processor to build from said module objects defining said workflow process in the language of one of a plurality of workflow servers.

15. A computer implemented process for operating a web flow server and at least one workflow server for defining and executing a workflow process, comprising the steps of:

providing a first representation of a workflow process in the language of a workflow server;

operating a front end processor to scan in said first representation, parse said first representation to identify lexical units, and issue calls based on said lexical units;

operating a modeler to build from said calls a dynamic process module;

operating a back end processor to build from said module objects defining said workflow process in the language of a workflow server; and operating within said front end processor grammars for process, structure, program, location, person, role, organization, level and network node.

16. A process for executing a workflow process, comprising the steps of:

submitting a process language statement of said workflow process;

translating said process language statement into an HTML statement of said workflow process;

inverse transforming said HTML statement into a modified process language statement of said workflow process; and executing said workflow process in accordance with said modified process language statement.

17. A process for executing a workflow process, comprising the steps of:

submitting a process language statement of said workflow process;

translating said process language statement into an HTML statement of said workflow process;

modifying said HTML statement of said workflow process;

inverse translating said HTML statement into a modified process language statement of said workflow process; and executing said workflow process in accordance with said modified process language statement.

18. A computer implemented process for operating a web flow server and at least one workflow server for defining and executing a workflow process, comprising the steps of:

providing a first representation of a workflow process in the language of a workflow server;

operating a front end processor to scan in said first representation, parse said first representation to identify lexical units, and issue calls based on said lexical units;

operating a modeler to build from said calls a dynamic process module; and operating a back end processor to build from said module objects defining said workflow process in the language of a workflow server;

said calls including at least one call from the set of calls including build process, build datastructure, build activity, build node settings, build program, build description, build attribute, build organization, build person, build role, build subentity, build connector, build block, build subprocess, and build level.

19. A computer implemented process for operating a web flow server and at least one workflow server for defining and executing a workflow process, comprising the steps of:

provided a first representation of a workflow process in the language of a workflow server;

operating a front end processor to scan in said first representation, parse said first representation to identify lexical units, and issue calls based on said lexical units;

operating a modeler to build from said calls a dynamic process module;

operating a back end processor to build from said module objects defining said workflow process in the language of a workflow server;

operating said front end processor initially to instantiate a process builder object; and responsive thereto, operating said modeler to create a process object for receiving subsequent attributes.

20. The method of claim 19, further comprising the step of operating said modeler responsive to each build call to create an object representing the type of build request and attach said object to an owning object by way of a linked list contained in said owning object.

21. The method of claim 20, further comprising the steps of:

operating said front end processor, said modeler and said back end processor during a first pass to provide a first output: in the language of a first workflow server; and responsive to said first output, operating said front end processor, said modeler and said back end processor during a second pass to provide a second output in the language of a second workflow server.

22. The method of claim 20, further comprising the steps of operating said modeler responsive to said linked list to provide at least one backend method selected from among the set including set_processBuilder, CreatEntityIterator, NextEntity, CreateSubEntityIterator, NextSubEntity, CreateSubSubEntityIterator, NextSubSubEntity, CreateAttributeIterator, NextAttribute, and NextAttributeValue.

23. A method for viewing, editing, translating and executing a workflow process, comprising the steps of starting a web browser;

pointing to the URL of a HTTP server hosting a hypertext representation of at least one workflow process;

selecting from said browser a workflow process to view, edit or execute;

if viewing, then examining the selected process;

if editing, then running a script to modify the selected process;

if executing, then running a script to transform the selected process from said hypertext representation to a selected workflow server representation selected from a set of a plurality of workflow server representations, and execute said selected process on said selected workflow server.

24. A workflow server, comprising:

a transformation mechanism responsive in a first pass to an input code string representation of a workflow process represented in one of a plurality of languages capable of parsing by a front end to provide an intermediate workflow process representation, the transformation mechanism including:

said front end for scanning and parsing said input code string to generate therefrom a first set of class methods;

a middle end for dynamically constructing from said first set of class methods a process model represented by a second set of class methods;

a back end responsive to said second set of class methods for extracting process information in the syntax of said intermediate workflow process representation; and said transformation mechanism being responsive in a second pass to a second input code string representative of said intermediate workflow process representation for generating a workflow process representation in the syntax of a workflow server.

25. The workflow server of claim 24, further comprising:

an HTTP server operable upon said intermediate workflow process representation for editing said process model.

26. A workflow server on the internet, comprising:

a transformation mechanism for transforming a first workflow process representation to an intermediate representation, said transformation mechanism including:

a front end for scanning and parsing a process definition language string represented in one of a plurality of languages capable of parsing by said front end;

a middle end responsive to said front end for representing an internal model of the processes represented in the process definition language, said middle end including a first set of class definitions that represent generic process characteristics, a second set of class definitions that define relationships among the first set of class definitions; and a set of utility classes that provide for ease of generation of the hypertext representation; said middle end further including a set of class methods for dynamically constructing the model as the scanning and parsing occurs in said front end; and a back end including a second set of class methods for navigating and extracting process information from said model and for generating an output representation of said workflow process based upon the model; and an inverse transformation mechanism for translating said output representation to a further process representation that a workflow server can use; the inverse transformation mechanism being implemented as a second pass through said transformation mechanism.

27. A computer readable medium for storing electrical signals for controlling the operation of a digital computer according to the steps of:

operating a front end processor to scan in an input code string; parse said code string to identify lexical tokens; and, issue modeler input calls based upon said tokens;

operating a modeler responsive to said modeler input calls to build a dynamic process module and restructure the model for easier access; and operating a back end processor to issue modeler output calls to build output pages executable as hyperlink text by a web browser from said module.

28. A program storage device readable by a machine, tangibly embodying a program of instructions executable by a machine to perform method steps for operating a web flow server and at least one workflow server for defining a workflow process, said method steps comprising:

providing a first representation of a workflow process in the language of a workflow server;

operating a front end processor to scan in said first representation, parse said first representation to identify lexical units, and issue calls based on said lexical units;

operating a modeler to build from said calls a dynamic process module; and operating a back end processor to build from said module objects defining said workflow process in the language of a workflow server;

said calls including at least one call from the set of calls including build process, build datastructure, build activity, build node settings, build program, build description, build attribute, build organization, build person, build role build subentity, build connector, build block, build subprocess, and build level.

29. A program storage device readable by a machine, tangibly embodying a program of instructions executable by a machine to perform method steps for operating a web flow server and at least one workflow server for defining a workflow process, said method steps comprising:

providing a first representation of a workflow process in the language of a workflow server;

operating a front end processor to scan in said first representation, parse said first representation to identify lexical units, and issue calls based on said lexical units;

operating a modeler to build from said calls a dynamic process module;

operating a back end processor to build from said module objects defining said workflow process in the language of a workflow server;

operating said front end processor initially to instantiate a process builder object; and responsive thereto, operating said modeler to create a process object for receiving subsequent attributes.

\* \* \* \* \*